(12) United States Patent
Hebbar et al.

(10) Patent No.: US 7,801,791 B2
(45) Date of Patent: Sep. 21, 2010

(54) METHOD AND APPARATUS FOR MANAGING INFORMATION AND COMMUNICATIONS RELATED TO MUNICIPAL BONDS AND OTHER SECURITIES

(75) Inventors: Sharda Hebbar, Longwood, FL (US); Mario Camchong, Orlando, FL (US)

(73) Assignee: Digital Assurance Certification, L.L.C., Orlando, FL (US)

(*) Notice: Subject to any disclaimer, the term of this patent is extended or adjusted under 35 U.S.C. 154(b) by 125 days.

(21) Appl. No.: 11/672,196

(22) Filed: Feb. 7, 2007

(65) Prior Publication Data

US 2007/0136174 A1 Jun. 14, 2007

Related U.S. Application Data

(63) Continuation of application No. 11/499,767, filed on Aug. 7, 2006, which is a continuation of application No. 10/314,863, filed on Dec. 9, 2002, now Pat. No. 7,155,408.

(60) Provisional application No. 60/375,546, filed on Apr. 25, 2002.

(51) Int. Cl.
*G06Q 40/00* (2006.01)

(52) U.S. Cl. ............... 705/36 R; 705/35; 705/36 T; 705/37

(58) Field of Classification Search ............ 705/35
See application file for complete search history.

(56) References Cited

U.S. PATENT DOCUMENTS

| | | | | |
|---|---|---|---|---|
| 4,566,066 A | * | 1/1986 | Towers | 705/36 R |
| 5,809,483 A | * | 9/1998 | Broka et al. | 705/37 |
| 5,893,079 A | | 4/1999 | Cwenar | 705/36 |
| 5,915,209 A | | 6/1999 | Lawrence | 455/31.2 |
| 6,161,099 A | | 12/2000 | Harrington et al. | 705/37 |
| 6,381,585 B1 | | 4/2002 | Maples et al. | 705/36 |
| 6,446,047 B1 | | 9/2002 | Brier et al. | 705/35 |
| 6,876,309 B1 | * | 4/2005 | Lawrence | 705/37 |
| 7,343,339 B2 | * | 3/2008 | Harrison et al. | 705/37 |

(Continued)

OTHER PUBLICATIONS

Amy B. Resnick, "Market Disclosure System Termed Seriously Flawed," Bond Buyer, New York, NY; Feb. 21, 2002, vol. 339, Iss. 31329; p. 4.*

(Continued)

*Primary Examiner*—Alexander Kalinowski
*Assistant Examiner*—Gregory Johnson
(74) *Attorney, Agent, or Firm*—Pillsbury Winthrop Shaw Pittman LLP

(57) ABSTRACT

A method and apparatus is provided for gathering information from issuers of municipal securities and distributing information evenly to municipal disclosure repositories, regulatory bodies and the public. A computer application enables an issuer to enter ongoing information about an issue to comply with contractual obligations to bond holders and to provide Brokers and Dealers with a procedure for facilitating regulatory requirements that provide prompt notice of events relating to bonds they recommend to customers. The computer application prompts issuers to file information that is required to be submitted on a periodic basis, and publishes such information to the public, while also transmitting such information to municipal disclosure repositories and/or regulatory bodies. If an issuer does not submit required information by a due date, a failure to file notice is generated. An audit trail is established for gathered and distributed information.

10 Claims, 27 Drawing Sheets

U.S. PATENT DOCUMENTS

| | | | |
|---|---|---|---|
| 2001/0039524 A1* | 11/2001 | Harrison et al. | 705/35 |
| 2001/0051879 A1 | 12/2001 | Johnson et al. | 705/2 |
| 2001/0051935 A1* | 12/2001 | Sugiura | 706/12 |
| 2002/0016758 A1 | 2/2002 | Grigsby | 705/36 |
| 2002/0099646 A1 | 7/2002 | Agarwal et al. | 705/37 |
| 2002/0152155 A1* | 10/2002 | Greenwood et al. | 705/38 |
| 2002/0156719 A1* | 10/2002 | Finebaum et al. | 705/37 |
| 2003/0046205 A1 | 3/2003 | Brier et al. | 705/35 |
| 2003/0046206 A1 | 3/2003 | Sato | 705/35 |
| 2003/0093351 A1* | 5/2003 | Sarabanchong | 705/36 |
| 2003/0110106 A1 | 6/2003 | Deshpande et al. | 705/36 |
| 2003/0120578 A1* | 6/2003 | Newman | 705/36 |
| 2003/0126055 A1* | 7/2003 | Thal et al. | 705/36 |
| 2003/0149654 A1 | 8/2003 | Harrington et al. | 705/36 |
| 2003/0163405 A1* | 8/2003 | Wiener et al. | 705/36 |
| 2003/0167221 A1* | 9/2003 | Kochansky | 705/36 |
| 2003/0204464 A1* | 10/2003 | Hebbar et al. | 705/36 |
| 2003/0225655 A1 | 12/2003 | Hughes, Jr. et al. | 705/36 |
| 2005/0071265 A1 | 3/2005 | Nishimaki | 705/38 |
| 2005/0097030 A1* | 5/2005 | Lawrence | 705/37 |
| 2005/0187857 A1 | 8/2005 | Tull, Jr. | 705/37 |
| 2007/0168218 A1* | 7/2007 | Harrison | 705/1 |

OTHER PUBLICATIONS

"A Different View of the NRMSIR Controversy," Bond Buyer, New York, NY; Oct. 9, 2001, vol. 338, Iss. 31239; p. 40.*

DAC Pushes 'Soup-to-Nuts' Disclosure System; Talks to Ruth the Bond Buyer , v 335 , n 31084 , Feb. 26, 2001, 2-pages.*

Issuers and Dealers Look for Way to Make Cusips Easier to Obtain Lynn Hume. Bond Buyer. New York, N.Y.: Aug. 23, 2002. vol. 341, Iss. 31456; 3-pages.*

Municipal bond issuance: Is there evidence of a principal-agent problem? Simonsen, Bill; Hill, Larry, Public Budgeting & Finance, v18n4 pp: 71-100, Winter 1998, 31-pages.*

SEC: Broker-Dealers Can Use DAC The Bond Buyer , v 337 , n 31230 , Sep. 25, 2001, 2-pages.*

Securities and Exchange Commission letter addressed to Vinson & Elkins LLP dated Sep. 21, 2001, 2 pages.

Hume, Lynn, "SEC: Broker-Dealers Can Use DAC Instead of NRMSIRs for Rule 15c2-12", reprinted from *The Bond Buyer*, Sep. 25, 2001, 1 page.

"National Federation of Municipal Analysts; *Recommended Best Practices in Disclosure for Variable Rate and Short-Term Securities*", Feb. 2003, 50 pages.

"CDI System Approval", *MSRB Reports*, vol. 17, No. 2, Jun. 1997, 3 pages.

"Rule 15c2-12—Municipal Securities Disclosure", *Securities Lawyer's Deskbook*, The University of Cincinnati College of Law, copyright 1998-2006, 8 pages.

MAC insights, Edition IV—Amended, A Publication of the Municipal Advisory Council of Texas, Sep. 1998, pp. 1-12.

MSRB Forum on Disclosure, Washington, D.C., Nov. 11-12, 1998, 10 pages.

MAC Insights, Edition V, A Publication of the Municipal Advisory Council of Texas, Feb. 1999, pp. 1-16.

"NCSHA's Pilot Program on Electronic Disclosure Gets Under Way", *The Bond Buyer*, May 19, 1999, p. 22.

Municipal Advisory Council of Texas letter dated May 21, 1999, 4 pages.

"Centralizing Disclosure?", by Lynn Hume, *The Bond Buyer*, The Daily Newspaper of Public Finance, Sep. 10, 1999, 2 pages.

Municipal Advisory Council of Texas, 45th Annual Meeting Presentation, Oct. 15, 1999, 13 pages.

MAC Insights, Edition IX, A Publication of the Municipal Advisory Council of Texas, Mar. 2000, pp. 1-12.

MAC Insights, Edition XI, A Publication of the Municipal Advisory Council of Texas, Sep. 2000, pp. 1-8.

DAC Web Service Screenshots (Welcome to DAC, DAC Search, Trustee Portfolio), copyright 2000, 7 pages.

MSRB Discussion Paper on Disclosure in the Municipal Securities Market, copyright 2000 Municipal Securities Rulemaking Board, 17 pages.

"DAC Pushes 'Soup-to-Nuts' Disclosure System: Talks to Ruth", by Lynn Hume, *The Bond Buyer*, Feb. 26, 2001, 3 pages.

"Filing with SEC; Electronic Submission of Official Statements, Advance Refunding Documents and Forms G-36(OS) and G-36 (ARD) to the MSRB", MSRB, vol. 21, No. 2, Jul. 2001, pp. 37-42.

Memorandum from The Bond Market Association to Secondary Market Disclosure Task Force—NRMSIR Subcommittee dated Aug. 21, 2001, 5 pages.

MAC Insights, Edition XV, A Publication of the Municipal Advisory Council of Texas, Sep. 2001, pp. 1-12.

"2001 Municipal Market Roundtable 'Secondary Market Disclosure for the 21st Century'", United States Securities and Exchange Commission, Division of Market Regulation, Office of Municipal Securities, Nov. 14, 2001, New York City, 68 pages.

MAC Insights, Edition XVI, A Publication of the Municipal Advisory Council of Texas, Dec. 2001, pp. 1-12.

MAC Insights, Edition XVII, A Publication of the Municipal Advisory Council of Texas, Mar. 2002, pp. 1-12.

Digital Assurance Certification (DAC) Marketing Brochure, copyright 2000, 62 pages.

Rulemaking for EDGAR System, Final Rule, Securities and Exchange Commission, Release Nos. 33-7855; 34-42712 et al., Apr. 24, 2000, pp. 1-18 and 27-39.

Apache Week, "Using User Authentication", Oct. 18, 1996, apacheweek.com/features/userauth, 6 pages.

"Filling with SEC; Changes Proposed to the CDI System", *MSRB Reports*, vol. 15, No. 2, Jul. 1995, 3 pages.

In U.S. Appl. No. 11/499,767, an Office Action issued on Mar. 30, 2009, 8 pages.

In U.S. Appl. No. 11/669,642, an Office Action issued on Nov. 25, 2008, 9 pages.

In U.S. Appl. No. 11/669,642, a Final Office Action issued on Aug. 14, 2009, 12 pages.

In U.S. Appl. No. 11/499,767, an Office Action issued on Jan. 20, 2010, 13 pages.

* cited by examiner

400

▷ Portfolio investor
▷ communication
   platform

▷ Investor
   messaging

▷ conference
   calling

▷ disclosure
   library about
▷ compliance
   reporting

▷ SEC
   letter

Tuesday, November 6, 2001

* Required input fields

Issue Information Form

Complete Issue Description*  [Complete Issue Description Test]

Issuer*  [Issuer Test]

Obligor*  [Obligor Test]
i.e., exact name of municipality, hospital, developer, etc.

CUSIP Base#*  [85225A] (6 digits)

Last 3 digits of CUSIP#*  [BC4, ST3]
(separate by commas)

Web Address  http://
County  [County Test]
City  [City Test]  State* [FL ▼]

Record Number  [         ]
Bondmaster/Cert Master Account Name

Obligor Contact Information

Obligor Contact Person  [Obligor Contact Person Test]
Contact Person's Title  [Contact Person Title Test]
Contact Person's Firm Name  [Contact Person's Firm Name Test]

Email Address*  [Test @         ]

Telephone Number  [407]-[123-4567]  Ext.[123]
Fax Number  [407]-[123-5689]

Mailing Address  [250 Park Ave]
                 [Suite 305]

City  [Winter Park]  State [FL ▼]
Zip Code  [32789]-[  ]

Trustee Information

Administrator Name*  [Test]

Trustee Bank*  [Test Federal Bank]

Phone No.*  [123] [456-7890]  Ext.[321]

Bond Counsel Information

Bond Counsel Firm Name  [Bond Counsel Firm Name Test]

Firm Contact  [Test]

Phone No.  [321] [654-9874]  Ext.[65623]

[Next] — 402

FIG. 4

Input Sheet Information

*Please check CUSIP Number and each Suffix before submitting this information to DAC. To correct any information, scroll to the bottom of the screen and select the Edit button.

Issuer Information

| | |
|---|---|
| Complete Issue Description | Complete Issue Description Test |
| Issuer | Issuer Test |
| Obligor | Obligor Test |
| CUSIP Number (6 digit) | 85225A |
| CUSIP Suffix (Last 3 digits) | BC4, ST3 |
| Record Number | |
| Web Address | http:h |
| County | County Test |
| City | City Test |
| State | FL |

Obligor Contact Information

| | |
|---|---|
| Obligor Contact Person | Obligor Contact Person Test |
| Contact Person's Title | Contact Person Title Test |
| Contact Person's Firm Name | Contact Person's Firm Name Test |
| Email Address | |
| Telephone Number | 407 - 123-4567 Ext: 123 |
| Fax Number | 407 - 123-5689 |
| Mailing Address | 250 Park Ave |
| | Suite 305 |
| City | Winter Park |
| State | FL |
| Zip Code | 32789 |

Trustee Contact Information

| | |
|---|---|
| Administrator Name | |
| Trustee Bank | |
| Phone No. | 123-456-7890 Ext. 321 |

Bond Counsel Information

| | |
|---|---|
| Bond Counsel Firm Name | Bond Counsel Firm Name Test |
| Firm Contact | Test |
| Phone No. | 321-854-9874 Ext. 65623 |

[Add Issuer] — 502
[Edit Info]

*FIG. 5*

Continuing Disclosure Information

To view your filed continuing disclosures, CLICK HERE.

To file a new continuing disclosure, select the applicable Description(s) listed below. You may select one or more document descriptions and click the Next button.

Upon completion of the Continuing Disclosure Document input you may disseminate the information to all required repositories by clicking on the send to NRMSIRs button. This information is posted to the investor communication center for public viewing.

Bond Documents:
- ☐ Official Statement
- ☐ Continuing Disclosure Amendment

Pre Defined Document Descriptions:
- ☐ Operating Data
- ☐ Audited Financial Statements
- ☐ CAFR
- ☒ Unaudited Financial Statement 1st Qtr
- ☐ Unaudited Financial Statement 3rd Qtr
- ☐ Unaudited Financial Statement 4th Qtr
- ☐ Executive Summary
- ☐ News Release
- ☐ Mgmt Discussions and Analysis
- ☐ Unaudited Financial Statement 2nd Qtr
- ☐ Unaudited Financial Statements

Customized Document Descriptions:
- ☐ Custom —906

902

[ Next ] —908

Complete Issue Description Test

| Continuing Disclosure Information | | | | |
|---|---|---|---|---|
| Event Type | Date Due | Date Submitted | Delete | Send to NRMSIRS |
| | | | | |

Update Disclosure Information
After entering information requested below, a completed document will be prepared for your review.
You may edit this document prior to submitting to the DAC database for dissemination.

| Unaudited Financial Statement 1st Qtr |

1002 — * Filing: [Annual ▼]
1004 — * Select Filing field to be notified by email of your document Due Date.
1006 — Date of Disclosure [12/31/2000]   (ex. mm/dd/yyyy)
— Fiscal Year End Date [09/30]   (ex. mm/dd)

1008 {
Due Date [          ]   (ex. mm/dd/yyyy)
-or-
Number of days from Fiscal Year End
[90]
}

1010 {
Attach HTML File * OPTIONAL
If you would like to attach information supporting your continuing disclosure, please click here:
[          ] [Browse...]

Attach NATIVE File * OPTIONAL
If you would like to attach information supporting your continuing disclosure, please click here:
[S:\Projects\Bank of NY] [Browse...]
}

1012 — [          |Next|          ]

FIG. 10

Continuing Disclosure Information

To view your filed continuing disclosures, CLICK HERE.

To file a new continuing disclosure, select the applicable Description(s) listed below. You may select one or more document descriptions and click the Next button.

Upon completion of the Continuing Disclosure Document Input you may disseminate the information to all required repositories by clicking on the send to NRMSIRs button. This information is posted to the Investor communication center for public viewing.

Bond Documents:
- ☐ Official Statement
- ☐ Continuing Disclosure Amendment

Pre Defined Document Descriptions:
- ☐ Operating Data
- ☐ Audited Financial Statements
- ☐ CAFR
- ☐ Unaudited Financial Statement 1st Qtr
- ☐ Unaudited Financial Statement 3rd Qtr
- ☐ Unaudited Financial Statement 4th Qtr
- ☐ Executive Summary
- ☐ News Release
- ☐ Mgmt Discussions and Analysis
- ☐ Unaudited Financial Statement 2nd Qtr
- ☐ Unaudited Financial Statements

Customized Document Descriptions:
- ☐ Custom

[ Next ]

Complete Issue Description Test

| Continuing Disclosure Information | | | | |
|---|---|---|---|---|
| Event Type | Date Due | Date Submitted | Delete | Send to NRMSIRS |
| 1. Unaudited Financial Statement 1st Qtr | 12/29/2000 | 11/08/2001 | ☒ | ⇧ |

Html: Upload Now
Native: Bank of New York Draft Letters.doc

*FIG. 11*

Material Event Notice

To view your filed material events, CLICK HERE. To file a Material Event Notice select the applicable Event listed below. A wizard will appear to prompt you to enter the required information necessary to produce the cover sheet in the format recommended by the MSRB. You also have the option to attach additional information. DAC then disseminates the information to all required repositories. This information is posted to the investor communication center for public viewing.

- Principal and Interest payment delinquencies
- Non-payment related defaults
- Unscheduled draws on debt service reserves reflecting financial difficulties
- Unscheduled draws on credit enhancements reflecting financial difficulties
- Substitution of credit or liquidity providers, or their failure to perform
- Adverse tax opinions or events affecting the tax-exempt status of the security
- Modification of rights of security holders
- Defeasances
- Bond Calls
- Rating Changes
- Release, substitution, or sale of property securing repayment of the securities
- Failure to provide annual financial information
- Other material event notice (specify)

Test Issue: Series 2000B, $75,000,000, DAC

Material Event Notices

| Event Type | Cusip Number | View | Delete | Send To NRMSIRS |
|---|---|---|---|---|
| | | | | |

Wizard

Principal and Interest payment delinquencies

After entering information requested below, a completed document will be prepared for your review. You may edit this document prior to submitting to the DAC database for dissemination.

◉ This applies to the entire bond Issue (Cusip Number):
11133P

○ This applies to this particular Cusip(s):
| 11133PDM3 |
| 11133PDS8 |
| 11133PDT9 |

(hold down "Ctrl" Key and click on all the CUSIPs you want to use.)

Due Date  09/30/2001   (ex. mm/dd/yyyy)
Amount $  10000000
Type of payment  Principal and Interest ▼

Prepared By

Name:
Title:  Tester
Company:

Attach File

* OPTIONAL
If you would like to attach information supporting your material event notice, please click here:

1302 — [            ]  Browse...

1304 — ☑ The information contained in this Material Event Notice is correct to the best of my knowledge.
*This box must be checked.

1306 — [ Next ]

ELECTRONIC DOCUMENT DELIVERY

MUNICIPAL SECONDARY MARKET DISCLOSURE INFORMATION COVER SHEET

This cover sheet should be sent with all submissions made to the Municipal Securities Rulemaking Board, National Recognized Municipal Securities Information Repositories, and any applicable State Information Depository pursuant to Securities and Exchange Commission Rule 15c2-12 or any analogous state statue.

Issuer's and/or Other Obligated Person's Name: Douglas County School District, Georgia
Issue(s) Description: Douglas County School District, Georgia, General Obligation Sales Tax Bonds, Series 2001, $30,000,000 CUSIP #259030LV4, LW2, LX0, LY8, LZ5

Douglas County School District, Georgia, General Obligation School Refunding Bonds, Series 1999, $25,100,000 CUSIP #259030LC6, LD4, LE2, LF9, LG7, LH5, LJ1, LK8, LL6, LM4, LN2, LP7, LQ5, LR3, LS1, LT9

Douglas County School District, Georgia, General Obligation Bonds, Series 1997, $18,000,000 CUSIP #259030 KV5, KW3, KX1, KY9, KZ6, LA0

CUSIP Numbers:
1. Nine-digit number(s) to which the information relates: ___See above___
2. Information relates to all securities issued by the Issuer having the following six-digit number(s):

•.•.•

Description of Material Event Notice/Financial Information (Check One):

1. __X__ Principal and Interest payment delinquencies
2. _____ Non-payment related defaults
3. _____ Unscheduled draws on debt service reserves reflecting financial difficulties
4. _____ Unscheduled draws on credit enhancements reflecting financial difficulties
5. _____ Substitution of credit of liquidity providers, or their failure to perform
6. _____ Adverse tax opinions or events affecting the tax-exempt status of the security
7. _____ Modification of rights of security holders
8. _____ Failure to provide annual financial information
9. _____ Defeasances
10. _____ Bond Calls
11. _____ Rating Changes
12. _____ Release, substitution, or sale of property securing repayment of the securities
13. _____ Other material event notice (specify) _____
14. _____ Financial Information: Please check all appropriate boxes:
   _____ CAFR
   _____ Audited Annual Financial Information
   _____ Unaudited Annual Financial Information
   _____ Operating Data
   _____ Other (Specify) _____
   Fiscal Period Covered: Fiscal Year End June 30, 2001

I hereby represent that I am authorized by the Issuer or its agent to distribute this information publicly.

Date: June 26, 2002
Name: Diana O'Brien    Title: Vice President
Employer: DAC
Address: 250 Park Avenue South, Suite 305
City, State, Zip Code: Winter Park, FL 32789
Voice Telephone Number: 407-599-1191
Email Address: dobrien@dac-ey.com 1402    1404
[Edit]   [Next]

*FIG. 14A*

Material Event Notice

To view filed material events, CLICK HERE. To file a Material Event Notice select the applicable Event listed below. A wizard will appear to prompt you to enter the required information necessary to produce the cover sheet in the format recommended by the MSRB. You also have the option to attach additional information. DAC then disseminates the information to all required repositories. This information is posted to the investor communication center for public viewing.

- Principal and Interest payment delinquencies
- Non-payment related defaults
- Unscheduled draws on debt service reserves reflecting financial difficulties
- Unscheduled draws on credit enhancements reflecting financial difficulties
- Substitution of credit or liquidity providers, or their failure to perform
- Adverse tax opinions or events affecting the tax-exempt status of the security
- Modification of rights of security holders
- Defeasances
- Bond Calls
- Rating Changes
- Release, substitution, or sale of property securing repayment of the securities
- Failure to provide annual financial Information
- Other material event notice (specify)

Test Issue: Series 2000B, $75,000,000, DAC

Material Event Notices

| Event Type | Cusip Number | View | Delete | Send To NRMSIRS |
|---|---|---|---|---|
| 1. Principal and Interest payment delinquencies | 11183PDM3, DS8, DT8, DW0 | | | |

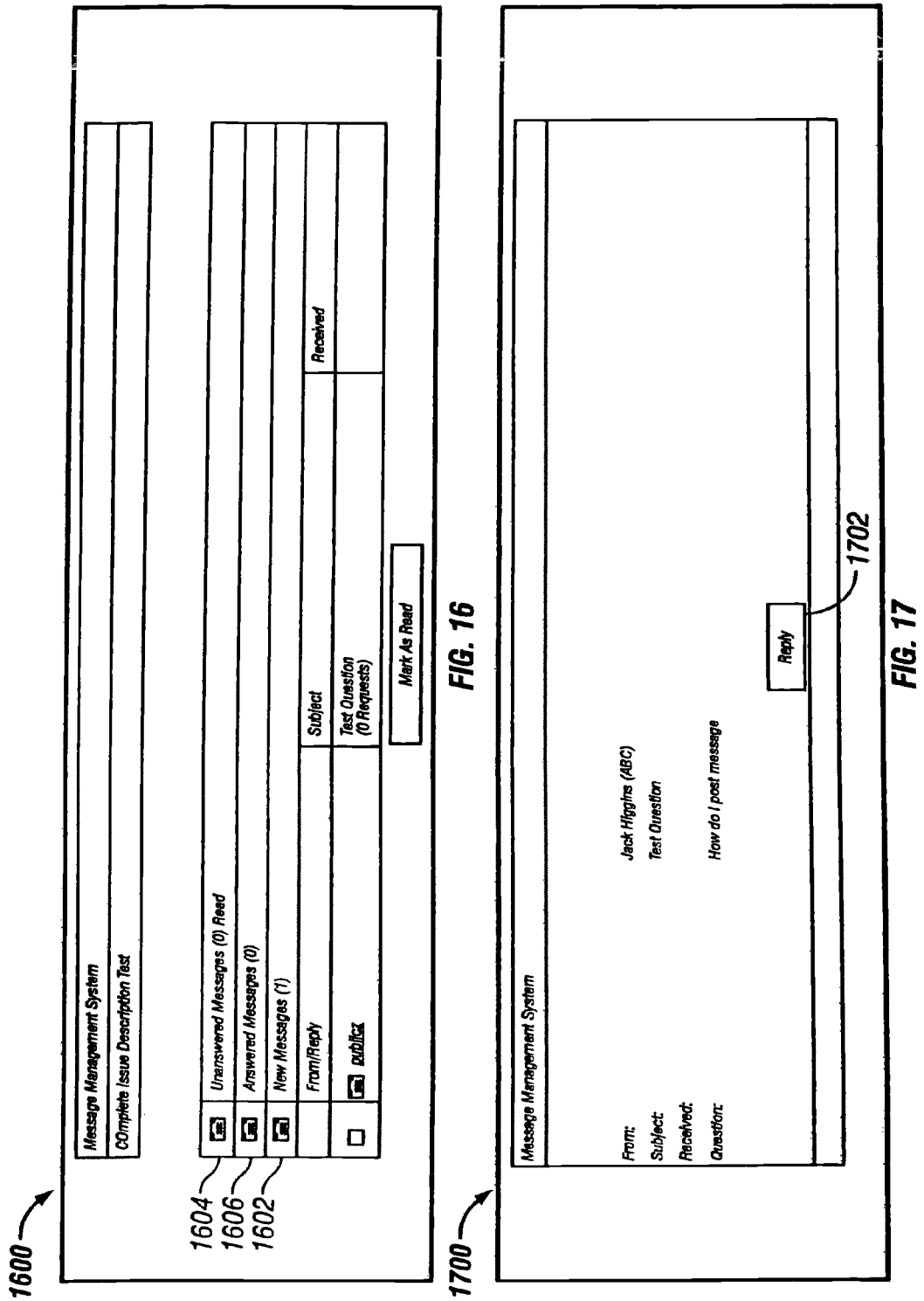

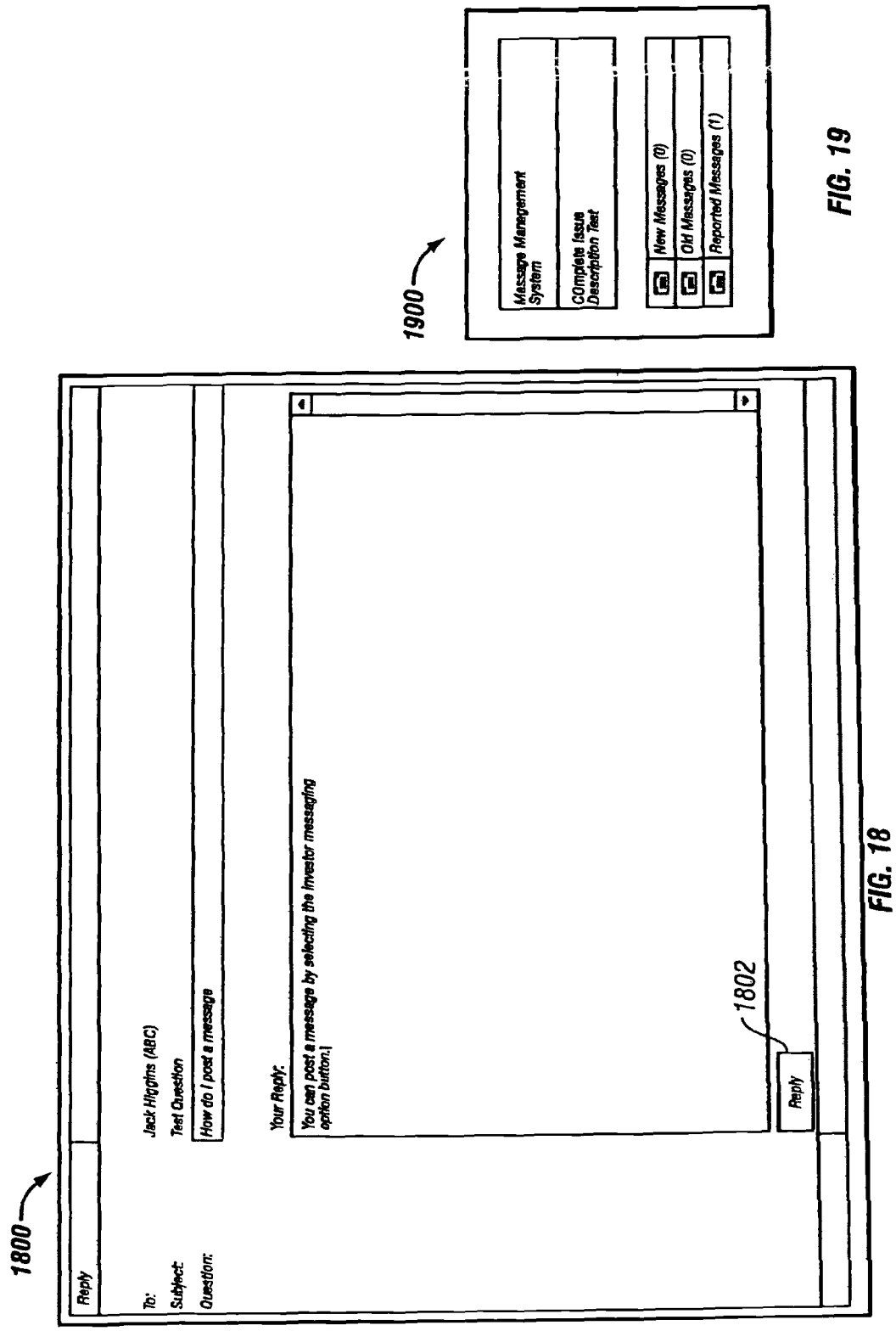

FIG. 22A

Material Event Notice

Cooper Health System (The) Healthcare Redevelopment Project Revenue Bonds, Series 1997 $89,400,000

Friday, December 6, 2002

To view and/or download a document, select the "View" button.
To view PDF files, download Acrobat Reader ▷ Back to Document List

Filed Material Event Notices

| Event Type | Date Posted | |
|---|---|---|
| Rating Changes | 09/04/2002 more... | View |
| Other material event notice (specify) | 01/18/2002 more... | View |
| Rating Changes | 06/22/2001 more... | View |

2302

Question regarding the material event notice you have viewed?

ELECTRONIC DOCUMENT DELIVERY

MUNICIPAL SECONDARY MARKET DISCLOSURE INFORMATION COVER SHEET

This cover sheet should be sent with all submissions made to the Municipal Securities Rulemaking Board, National Recognized Municipal Securities Information Repositories, and any applicable State Information Depository pursuant to Securities and Exchange Commission Rule 15c2-12 or any analogous state statue.

Issuer's and/or Other Obligated Person's Name: Douglas County School District, Georgia
Issue(s) Description: Douglas County School District, Georgia, General Obligation Sales Tax Bonds, Series 2001, $30,000,000 CUSIP #259030LV4, LW2, LX0, LY8, LZ5

Douglas County School District, Georgia, General Obligation School Refunding Bonds, Series 1999, $25,100,000 CUSIP #259030LC6, LD4, LE2, LF9, LG7, LH5, LJ1, LK8, LL6, LM4, LN2, LP7, LQ5, LR3, LS1, LT9

Douglas County School District, Georgia, General Obligation Bonds, Series 1997, $18,000,000 CUSIP #259030 KV5,KW3,KX1,KY9,KZ6,LA0

CUSIP Numbers:

1. Nine-digit number(s) to which the information relates: ___See above___
2. Information relates to all securities issued by the issuer having the following six-digit number(s):

\*.\*.\*

Description of Material Event Notice/Financial Information (Check One):

1. ____ Principal and interest payment delinquencies
2. ____ Non-payment related defaults
3. ____ Unscheduled draws on debt service reserves reflecting financial difficulties
4. ____ Unscheduled draws on credit enhancements reflecting financial difficulties
5. ____ Substitution of credit of liquidity providers, or their failure to perform
6. ____ Adverse tax opinions or events affecting the tax-exempt status of the security
7. ____ Modification of rights of security holders
8. ____ Failure to provide annual financial information
9. ____ Defeasances
10. ____ Bond Calls
11. ____ Rating Changes
12. ____ Release, substitution, or sale of property securing repayment of the securities
13. ____ Other material event notice (specify) _____
14. _X_ Financial Information: Please check all appropriate boxes:

____ CAFR
 _X_ Audited Annual Financial Information
 ____ Unaudited Annual Financial Information
 _X_ Operating Data
 ____ Other (Specify) _____
 Fiscal Period Covered: Fiscal Year End June 30, 2001

I hereby represent that I am authorized by the issuer or its agent to distribute this information publicly:

Date: June 26, 2002
Name: Diana O'Brien    Title: Vice President
Employer: DAC
Address: 250 Park Avenue South, Suite 305
City, State, Zip Code: Winter Park, FL 32789
Voice Telephone Number: 407-599-1191
Email Address: dobrien@dac-ey.com

METHOD AND APPARATUS FOR MANAGING INFORMATION AND COMMUNICATIONS RELATED TO MUNICIPAL BONDS AND OTHER SECURITIES

CROSS-REFERENCE TO RELATED APPLICATIONS

This application is a continuation of U.S. patent application Ser. No. 11/499,767, filed Aug. 7, 2006, which is a continuation of U.S. patent application Ser. No. 10/314,863, filed Dec. 9, 2002, and issued as U.S. Pat. No. 7,155,408 B2 on Dec. 26, 2006, which claims priority to U.S. Provisional Patent Application Ser. No. 60/375,546, filed Apr. 25, 2002.

BACKGROUND OF THE INVENTION

1. Technical Field

The present invention relates generally to a method and apparatus for managing bonds. More specifically, the present invention accepts initial information about a municipal bond as well as subsequent information about the bond that is required to be disclosed. The present invention also makes this information available to regulated entities required to access the information, to central locations designated by regulators to receive the information, to the public and to other entities.

2. Description of the Related Art

The issuance, offer and sale of municipal bonds is regulated by federal securities law. These regulations, in part, mandate brokers and dealers transacting in municipal bonds to have reliable access to disclosed material information concerning the bond issuer's financial condition and operation to require bond issuers to provide these disclosures at the time the bonds are issued, and periodically over the lifetime of the bond. In addition, the issuer must disclose certain important events as they occur.

Traditionally, disclosing this information in a satisfactory and coherent manner was difficult, as was accessing information regarding a municipal bond prior to a broker's recommending it to a customer. For some time, the Securities and Exchange Commission (SEC) has required bond issuers to disclose the above-mentioned information to Nationally Recognized Municipal Securities Information Repositories (NRMSIRs), State Information Depositories ("SIDs"), and disclosure information systems established and operated by the Municipal Securities Rulemaking Board ("MSRB Systems," and, together with NRMSIRs and SIDs "Municipal Disclosure Repositories," referred to herein as MDRs). MDRs were created by the SEC to serve as points where information could be deposited by issuers and retrieved by interested parties. As a means of preventing fraud in the municipal market, Brokers and Dealers (as those terms are legally defined by the SEC) in municipal securities are required to have access to systems, including Municipal Disclosure Repositories that provide reliable information about municipal issuers and their bonds.

Issuers, however, have had difficulty in fully utilizing NRMSIRs, SIDs and MSRB Systems. Some issuers contend that NRMSIRs are not "user friendly," and that there is little feedback when incomplete information is accidentally submitted. Further, NRMSIRs do not affirmatively remind issuers when information is due to be submitted. Brokers and Dealers transacting in municipal bonds have had difficulty in meeting regulatory requirements because of uncertainty over the reliability of information available through NRMSIRs. Specifically, whether information required to be filed was, in fact, received by the NRMSIRs and whether the information was received have been difficult to determine. Brokers and Dealers have complained that the information on file at each of four current NRMSIRs is inconsistent and the SEC staff has noted inconsistent filings among NRMSIRs in sample studies. Also, Issuers cannot verify that their disclosure filings have been received and accurately filed with NRMSIRs, SIDs and MSRB Systems. Brokers and Dealers transacting in municipal bonds cannot easily verify the reliability of Municipal Disclosure Repositories. As a result, Brokers and Dealers transacting in municipal bonds cannot with certainty comply with current regulatory mandates.

Thus, a need exists for a system that reliably indicates whether required information with respect to a municipal bond or similar security has or has not been timely filed. This system should allow for the simple, timely, and reliable submission of bond information as required by the SEC. This system should verify, to the extent possible, that all required information has been filed and is contained within an issuer's submitted bond information. The system should then simultaneously "publish" the information by making it available on the Internet. In addition, the system should send the information on to the NRMSIRs, SIDs and MSRB Systems to fulfill the issuers' legal obligations. The system should provide Brokers and Dealers transacting in a municipal bond reasonable assurance that it will receive prompt notice of any event relating to that municipal bond disclosed pursuant to SEC regulation applicable to municipal securities. The system should provide a secure system for the electronic submission, storage, transmission and retrieval of audited financial statements and other information in conformity with professional standards. The system should also provide a secure means for communication among issuers, their agents, and investors, including by electronic mail and teleconferencing. The system should also periodically remind the issuers when new information about their bonds is due.

SUMMARY OF THE INVENTION

Generally, the present invention is a method and apparatus for gathering information from issuers of municipal securities and distributing information evenly to municipal disclosure repositories, regulatory bodies and the public. A central aspect of the present invention is a computer application, which can be implemented on a computer system that is attached to a network of computers and other communication devices, such as the Internet. Initially, the application accepts the full name description of a particular municipal security issue, together with a unique identifier assigned by CUSIP. The system grants a secured and encrypted password to the issuer enabling the issuer to enter ongoing information about the issue. This information may include annual audits of the issuer, certain operating data, and any event notices deemed material by the issuer. Such information is provided to comply with the contractual obligations of the issuer to the bond holders and to provide Brokers and Dealers with a procedure for meeting regulatory requirements that provide prompt notice of events relating to bonds they recommend to customers. For information that is required to be submitted on a periodic basis, the system determines when the information is due to be submitted, and prompts the issuer to file such information with the system. This information is then published to the public, and, simultaneously, transmitted to the municipal disclosure repositories and/or regulatory bodies via a one-click dissemination system. If the issuer does not submit the required information by the due date, the system files a notice that the required information was not submitted by the issuer. Additionally, the system establishes an audit trail for gathering and the distribution of the information. Another important aspect of the audit includes receiving and archiving a receipt that information was transmitted to the municipal disclosure repositories and/or regulatory body. Finally, the system provides a secure platform for communication among issuers and their investors via electronic mail and teleconferencing.

BRIEF DESCRIPTION OF THE DRAWINGS

The novel features which are believed to be characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a form presented by the application in a screen that collects information from an issuer about a new bond;

FIG. 5 is a screen that presents a summary of the information entered in the form shown on the previous screen;

FIG. 9 is a screen from which an issuer begins the process of submitting a disclosure document;

FIG. 10 is a screen from which an issuer continues to enter information for a disclosure document;

FIG. 11 is a screen that confirms the input of the disclosure document (previously entered in screen 1000) and allows information to be transmitted to MDRs;

FIG. 12 is a screen from which an issuer begins the process of submitting an MEN;

FIG. 13 is a screen from which an issuer continues to enter information about the MEN;

FIG. 14A is a screen that shows an e-version of the MSRB coversheet that will be sent to the MDRs;

FIG. 14B is a screen that presents a summary of the MENs that have been submitted and their status;

FIG. 16 is a screen that presents a variety of messages to an issuer;

FIG. 17 is a screen from which an issuer can reply to an inquiry;

FIG. 18 is a screen from which an issuer can draft a reply to an inquiry;

FIG. 19 is a screen that shows the status of an issuer's messages;

FIG. 22A is a screen showing the search results;

FIG. 23 is a screen that shows the bond selected in screen 2200;

FIG. 24 is a screen that shows the MSRB coversheet related to a filed MEN;

FIG. 25 is a screen that shows detailed information about disclosure documents associated with the selected bond;

FIG. 26 is a screen that allows a visitor to draft an email message to an issuer;

FIG. 27 is a screen that shows replies to emails sent by the visitor, among other email messages.

DETAILED DESCRIPTION OF THE INVENTION

Generally, the present invention is comprised of a computer system and software program that causes the computer system to operate as described below. In a particular embodiment of the present invention, these items function as a web site, and enable municipal bond issuers (issuers) to post information so that the potential buyers and sellers of the issuers' bonds can review the information in order to make informed decisions.

Figure 1:
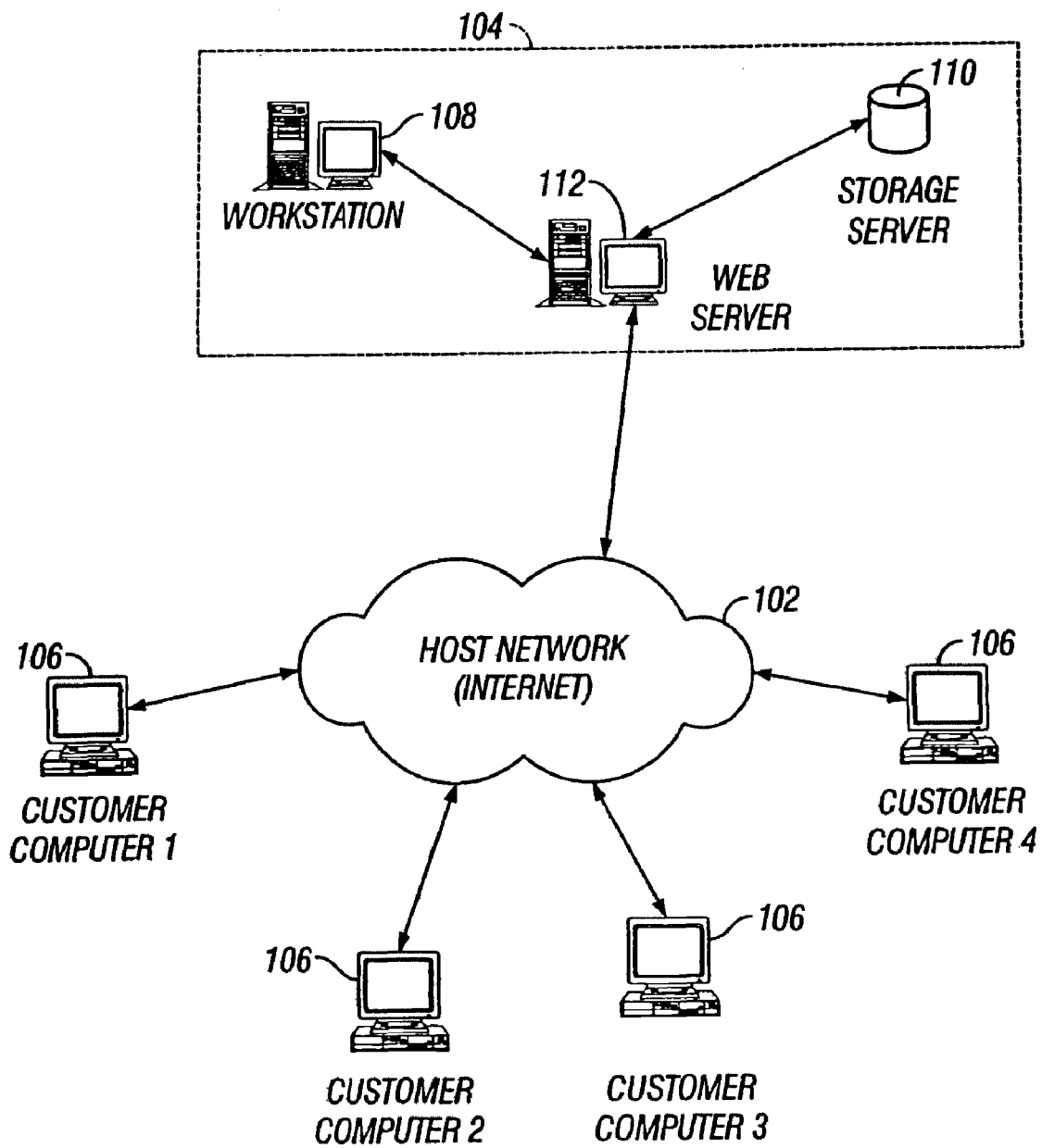
FIG. 1 illustrates a connected network and a series of computers upon which the present invention can be implemented.
Figure 2:
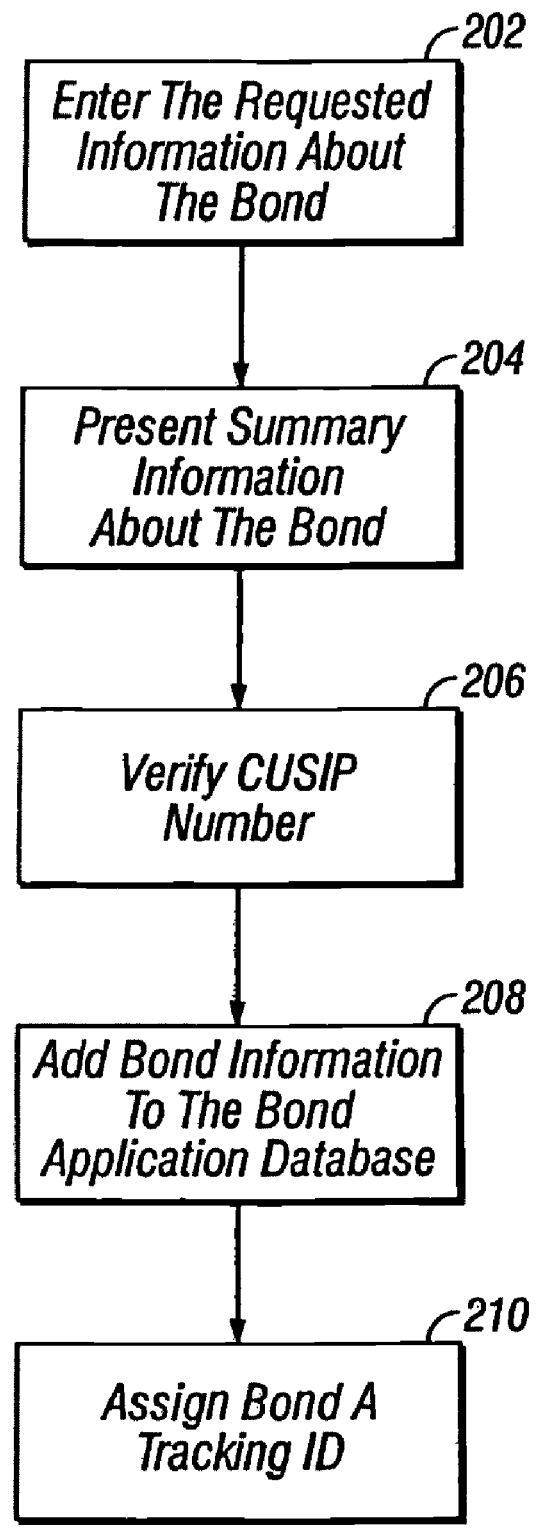
FIG. 2 is a flowchart that shows how an issuer creates an entry for a new bond.

FIG. 1 illustrates a connected network and a series of computers upon which the present invention can be implemented. As illustrated in FIG. 1, host network 102 is a connected network computers, an example of which is the Internet. Host network 102 can also be implemented by using a private access wide area network (WAN) or any other network. The size of the network is not material to operation of the present invention.

Attached to host network 102 is application server 104. In most implementations, application server 104 is a network of computers that store, access, and process all of the information relating to a number of municipal bonds. As shown in FIG. 1, application server 104 is composed of web server 112 for interacting with host network 102, workstation 108 for executing various programs such as a relational database management program for organizing and indexing information associated with the bonds being tracked by the system, and storage server 110 for providing disk storage for the various data required by web server 112 and workstation 108. This is but one embodiment of application server 104. Depending upon the computational and storage requirements placed on application server 104, application server 104 could be implemented as a single personal computer or a complex of several mainframes. The exact configuration of application server 104 is not material to the present invention, and will undoubtedly vary over time and on the demands placed upon application server 104.

Also connected to host network 102 are customer computers 106. These computers can be implemented using any general-purpose computer configured to transmit and receive information via host network 102. Customer computers 106 can be implemented using personal computers or workstations such as those sold by Dell, Compaq, Sun, Apple and others. These computers often operate under the control of an operating system having a graphical-user interface, and execute a software program that enables customers to request, receive, display and manipulate data from the connected network, examples of which are Microsoft's Internet Explorer and Netscape Navigator. Customer computers 106 allow customers to receive and view screens transmitted from application server 104, and allow customers to transmit information back to application server 104 via host network 102.

Although the description of FIG. 1 contemplates that customer computers 106 will be implemented using traditional personal computers, a variety of other communication devices can be used instead of traditional personal computers.

For example, personal digital assistants (PDA's) and cellular phones are now capable of transmitting data to and receiving data from a connected network. Since these devices can transmit data to and receive data from a connected network, they can perform all of the tasks required by customer computers as these computers are used in the present invention. Thus, any device that can transmit data to/receive data from a connected network is, for purposes of the specification and claims, to be considered equivalent to a customer computer.

The following discussion refers to three types of entities: administrators, issuers, and visitors. For the purposes of this disclosure, an administrator is the operator of the web site embodying the invention. An issuer is the entity that has actually issued the bond, or its designated representative. The issuer is responsible for continually submitting information that is related to the bond. For municipal bonds, the issuer will usually be a city, state, or other governmental taxing entity (e.g., a school district). As used herein, an issuer can also be an attorney, underwriter, insurance provider etc. representing the actual issuer of the bond. A distinction will be made between issuers and their attorney, but, otherwise, the term "issuer" applies to both of these entities. A visitor is any person (or entity) seeking information about a bond on the web site.

Some of the figures discussed below are flowcharts that describe methods of operation according to the present invention. Numbers found in parentheses in the following discussion (e.g., (504)) refer to a step in one of the flowcharts. The discussion of the methods shown in the flowcharts is intertwined with discussions of various figures that contain screen images. These screens depict images that appear on a display device of a user accessing a web site operating according to the present invention. The code for these screens is run on the application server and is transmitted via host network to a computer, which displays the code in the form of images and/or text on the computer's display device. When information is entered in a screen, this information is transmitted back to the application server via the connected network.

The software application which operates according to the present invention (the bond application) is designed to be accessed by administrators, issuers, and visitors. Data exchanged between these entities' and the bond application occurs using the secure socket layer protocol or other comparable secure environment. Operating in such a manner ensures that information exchanged with the bond application is authentic, and, in the case of confidential information, is secure.

The discussion below first discusses the bond application from the perspective of the issuer. Then, the application is described from a visitor's perspective.

Figure 3:
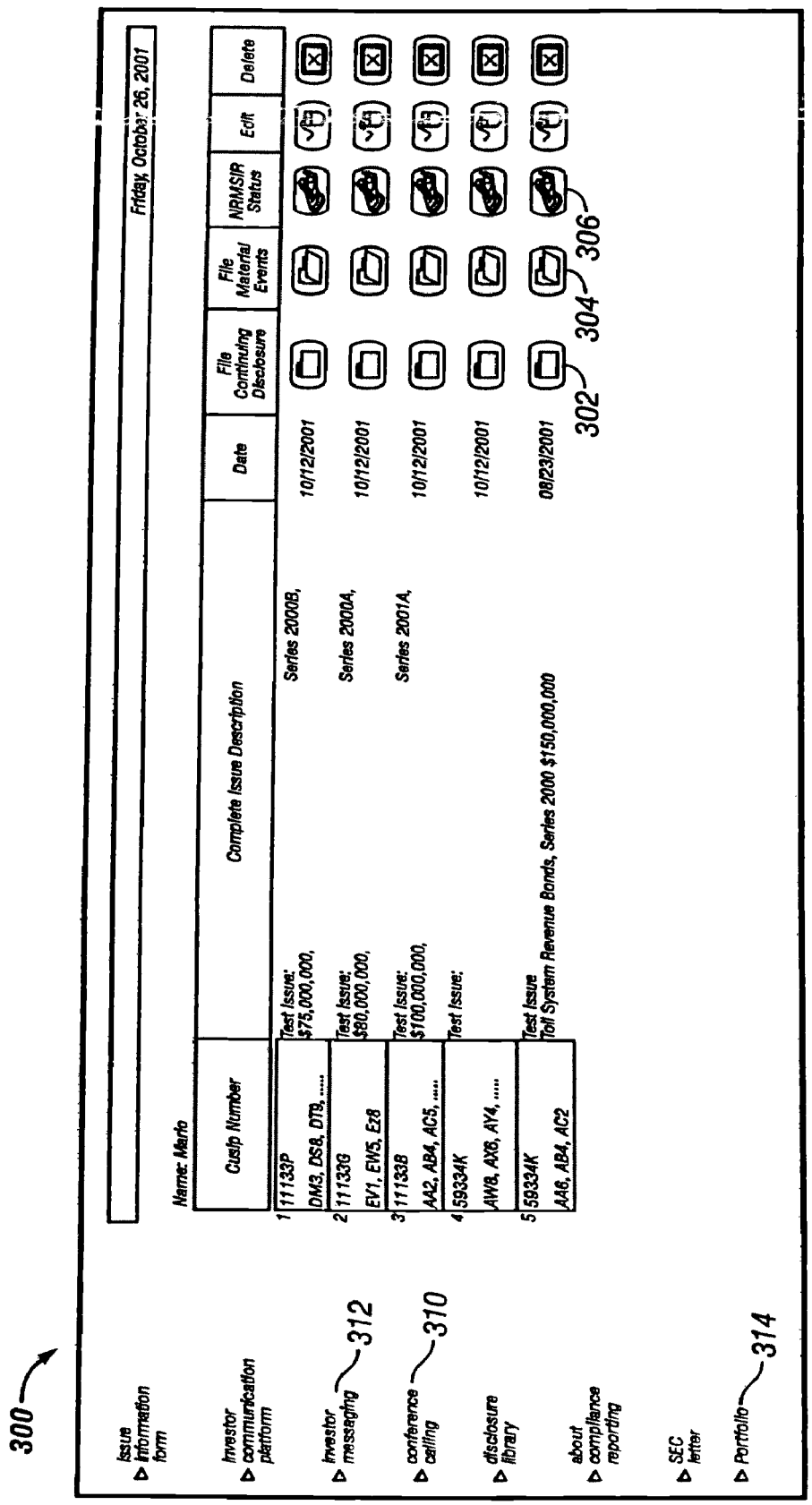
FIG. 3 is the main menu presented to an issuer.

FIG. 3 shows the screen that is displayed when the issuer logs-in to the bond application. In a preferred embodiment of the present invention, the login is accomplished by the issuer inputting a user name and password. Screen 300 initially presents an overview of the bonds belonging to the person who logged-in to the bond application. If the person logging in is an issuer, a list of all bonds issued by the issuer is presented. On the other hand, if the person logging in is an attorney, all of the bonds being handled by the attorney is displayed. In this particular example, screen 300 shows only a single bond. From screen 300, the issuer can select button 314 to create an entry for a new bond, or the issuer can select from buttons/links 302 312 to take action with respect to a particular bond.

If the issuer selects button 314 from screen 300, form 400, shown in FIG. 4, is displayed on one or more screens. Initially, the issuer completes the information requested in form 400 (202) then selects button 402. Among the information entered by the issuer is the full issue description of the bond. Requiring the full issue description of the bond to be entered makes identifying the bond easier than if ad hoc abbreviations are used for certain words.

The bond application then presents the issuer with screen 500 (FIG. 5). This screen is an overview of the information previously entered by the issuer in form 400. The issuer reviews the information in screen 500 and corrects the information as necessary (204). In one embodiment of the present invention, the information described in form 400 is entered and reviewed, the bond application verifies the CUSIP number (206). Verification of the CUSIP number can be accomplished by cross-referencing the CUSIP (Committee on Uniform Securities Identification Procedures) database, and, assuming it is a valid number, the bond application creates an entry in a database that is used to store the various bonds that are managed by the bond application.

Once the issuer concludes that the information is all correct, the issuer selects button 502 to add the bond to the bond application (208). Once a bond is entered into the bond application, a tracking ID is associated with the bond (210). The tracking ID is a unique ID to track an individual issue. The system will then allow this person to file disclosure documents and material event notices (as will be described below) for the bond.

Figure 6:
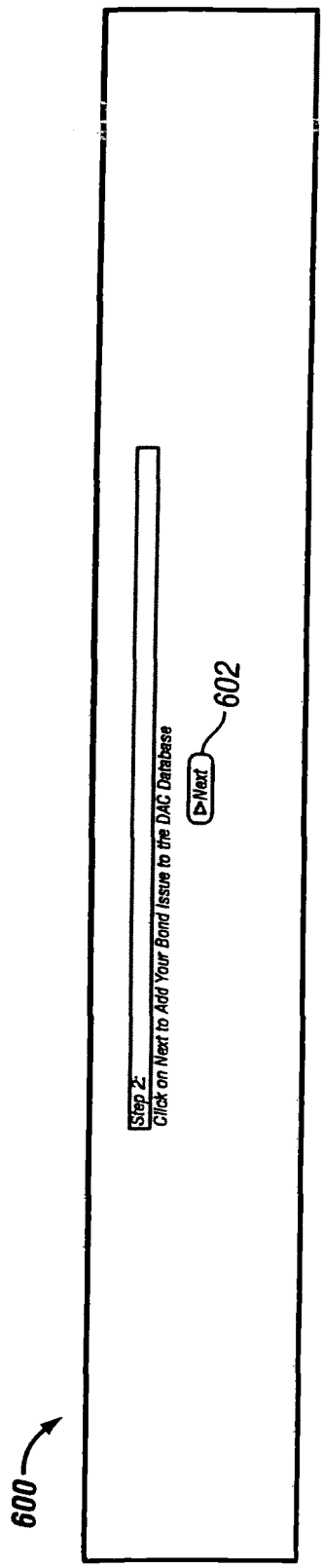
FIG. 6 is a screen that allows the bond to be added to the bond application.
Figure 7:
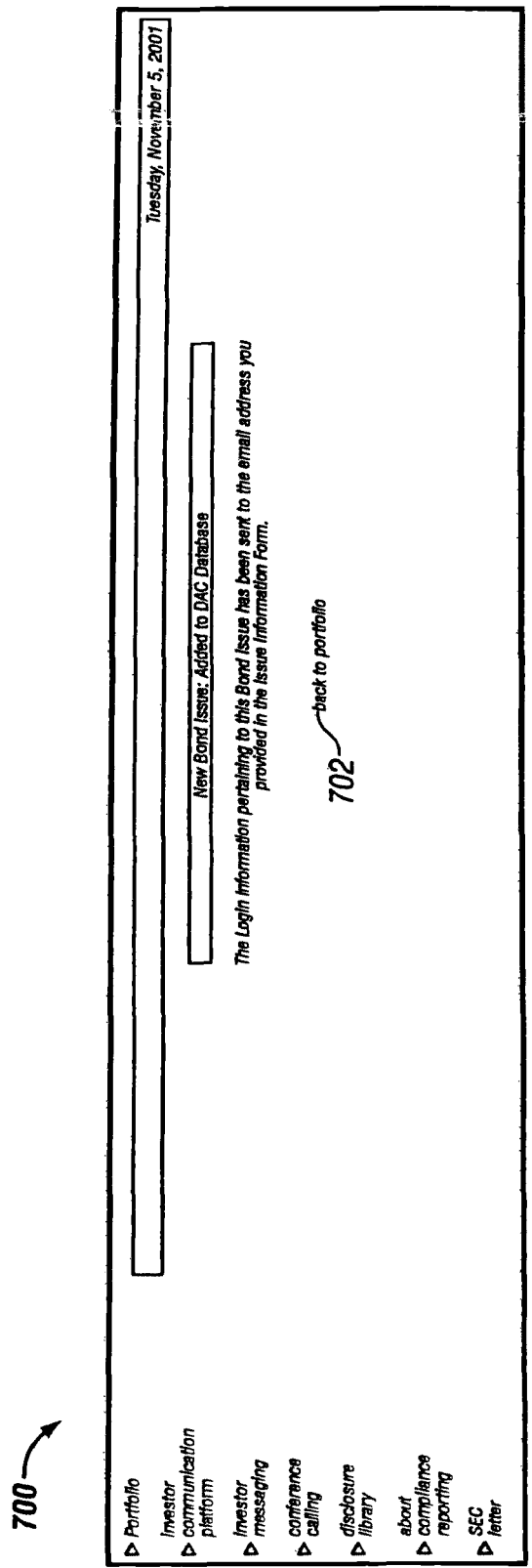
FIG. 7 is a screen that confirms the bond has been successfully entered into the bond application.

After the issuer selects buttons 502 and 602 (FIG. 6), the bond application presents confirmation screen 700 (FIG. 7). This screen confirms that the bond has been successfully logged in to the bond application, and that a confirmation message has been sent to the issuer, bond counsel, and others as specified in form 400. Upon selection of button 702, the issuer is returned to screen 300.

From screen 300, the issuer can select buttons/links 302 312 to manage various aspects of a particular bond. Selection of one of these buttons opens a new window on the issuer's computer system and subsequent screens related to a particular button are presented in that new window.

Figure 8:
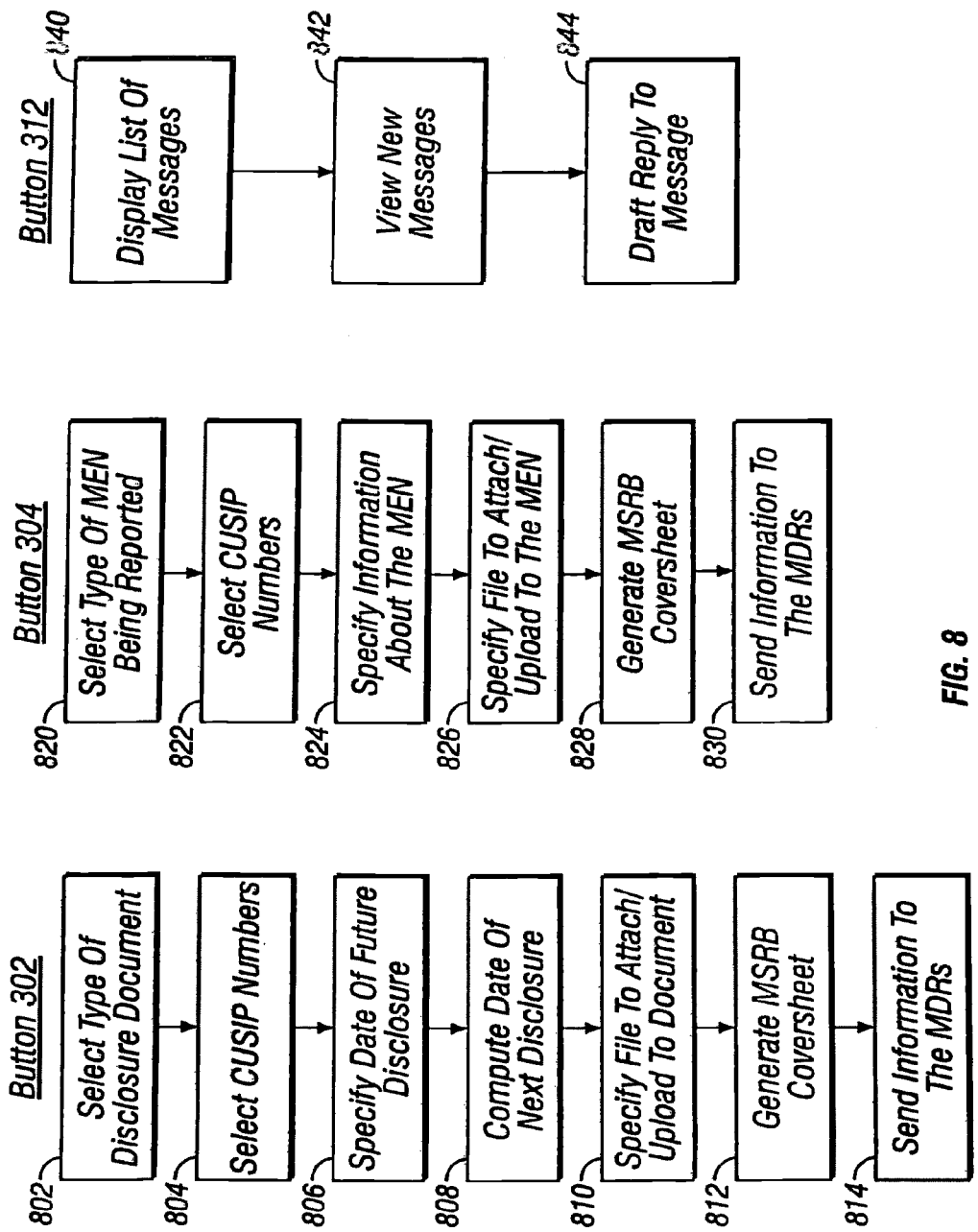
FIG. 8 is a flowchart illustrating some of the options available from screen 300.

Upon selecting button 302, the issuer is taken to screen 900 (FIG. 9). Screen 900 allows the issuer to begin the process of submitting a disclosure document about the financial condition of the issuer. Initially, the issuer selects one of the applicable descriptions 902/906. The selection by the issuer depends on the type of disclosure document the issuer is filing (802) (FIG. 8). The button selected by the issuer depends on whether the issuer is filing a new disclosure document or an amended document (802) (FIG. 8). As shown in screen 900, the issuer is submitting an audited financial statement. If the information being submitted by the issuer is not found in options 904, the issuer may submit custom information by selecting option 906. In addition, in future embodiments, the issuer can specify additional bonds for which the disclosure document will apply by entering their CUSIP number (804). After the proper buttons have been selected, the issuer advances to the next screen in the process by selecting button 908.

Screen 1000 (FIG. 10) is displayed after the issuer selects button 908. From screen 1000, the issuer enters information about the disclosure, and can attach a file as an attachment to support the disclosure. Filing box 1002 allows the issuer to specify how often this type of disclosure document should be filed. Date box 1004 accepts the date of the disclosure, and date box 1006 accepts the fiscal year end. Boxes 1008 accept data that specifies the due date for future disclosures of this type (806). Using the information specified in boxes 1006 1008, the bond application computes the due date for the next disclosure of this type, and will send email reminders at predefined frequency to the issuer that a disclosure is coming due (808).

For example, as shown in screen 1000, the due date for this type of disclosure is shown as being 90 days from the fiscal year end, which is 12/31. Also, this type of disclosure is to be submitted on an annual basis. Thus, at some point before June 30 of the next year, the bond application will send emails to the issuer reminding it that a new disclosure is due. In a preferred embodiment of the present invention, reminders are sent to the issuer 60, 30, 15 and 7 days before the disclosure is due.

If the issuer does not submit the required disclosure information by the due date, the bond application automatically generates a "failure to file notice." A failure to file notice is a notice that a required (SEC Rule 15c2-12) disclosure document for a particular bond was not timely submitted by the issuer. This failure to file notice is made available to the public via the bond application and is also transmitted to the Municipal Disclosure Repositories. As used herein, the term "Municipal Disclosure Repositories" (MDRs) includes Nationally Recognized Municipal Securities Information Repositories (NRMSIRs), State Information Depositories (SIDs), the Municipal Securities Rulemaking Board (MSRB) and any other entity that has been designated as a repository of bond information or is otherwise required to receive such information. In one embodiment of the present invention, a human has to approve the generation and transmission of the failure to file notice. In other embodiments, however, the generation and transmission of such notices can be performed by the bond application without human intervention.

Also in screen 1000, the issuer can choose to upload/attach a file supporting the disclosure (810). These files usually contain more detailed information about the disclosure. The issuer can specify that a certain file be attached to the information by entering the name and location of the file in the box 1010.

After the issuer finishes completing the information shown in screen 1000, the issuer selects button 1012 to advance to screen 1100 (FIG. 11). Screen 1100 is similar to screen 900, except that the disclosure document previously entered in screen 1000 is now shown under status bar 1102. Using the "Delete" icon 1104, the issuer can delete the disclosure document previously entered. On the other hand, if the issuer is satisfied with the information, the issuer can activate "Send to NRMSIRs" icon 1106. In one embodiment of the present invention, an MSRB coversheet accompanies the disclosure information, an example of which is shown in screen 2400. However, the generation of such notices can be performed by the bond application without human intervention (812). Finally, the information will be sent on to the NRMSIRs and other MDRs, and will, simultaneously, be made available to visitors using the bond application, as will be discussed below (814).

The issuer can select button 304 to submit an MEN (Material Event Notice). Upon selecting button 304, screen 1200 (FIG. 12), is presented to the issuer. Screen 1200 displays a list of the different types of MENs. From this screen, the issuer can select the applicable event the issuer is reporting (820). If none of the options are appropriate, the issuer can select the last option entitled "Other material event notice (specify)" and describe the action. After selecting the "Principal and interest payment delinquencies" option, screen 1300 (FIG. 13) appears. If the issuer had selected one of the other options, a different screen would have appeared. Generally, the various screens simply ask for information related to the event selected in screen 1200. In screen 1300, the issuer can select additional bonds that this MEN is applicable to by specifying their CUSIP numbers (822). In addition, the user is prompted to fill in various boxes with information related to the selection made in screen 1200 (824). The issuer can also specify that a certain file be attached to the information by entering the name and location of the file in box 1302 (826). The issuer has to affirm the accuracy of the information entered in this screen by checking box 1304. When the issuer finishes inputting information into screen 1300, the issuer advances to screen 1400 (FIG. 14A) by selecting button 1306.

Screen 1400 is a summary of the information to be sent to the MDRs regarding the MEN selected in screen 1200 in the form of an MSRB coversheet (828). The issuer reviews this information, then selects button 1402 to edit the information, or button 1404 to save the information and proceed to screen 1450 (FIG. 14B). Screen 1450 shows the various MENs that have been submitted to the bond application and whether the information has been submitted to the MDRs. Selection of button 1452 presents the MEN as it will be (or has been) submitted to the MDRs, while selection of button 1454 allows a particular MEN to be deleted if it has not been submitted to an MDR. Button 1456 will send a particular MEN to the MDRs if it has not been sent already. At the same time the MEN is sent to the MDRs, it is also made available to visitors using the bond application (830).

All documents associated with the bond (e.g., disclosure documents and MENs) are stored by the bond application for the life of the bond or until termination of engagement. In one embodiment of the present invention, a human can publish documents without transmission to the MDRs. In other embodiments, however, publishing without transmission can be performed by the bond application without human intervention.

Figure 15:
FIG. 15 is a screen showing the various submissions that have been made to NRMSIRs.

The issuer can review all of the information that has been submitted to the MDRs by selecting button 306 from screen 300. Upon selecting this button, screen 1500 (FIG. 15) appears. This screen contains a list of all of the events/information which have been submitted to the MDRs, the particular MDRs to which a particular data item was submitted, the date the information was sent, and the CUSIP number of the bond for which the information was submitted.

After either a disclosure document or an MEN is submitted to the MDRs, the bond application expects to receive a confirmation of receipt from the MDRs to which information was sent. If the expected confirmation is not received, the bond application alerts an operator that certain MDRs failed to receive information transmitted to them. Otherwise, the application posts an e-receipt confirming delivery of the information to the MDRs with a date/time stamp.

Selection of link 310 allows the issuer to request a conference call about the bond. Upon selection of link 310, a screen is displayed that allows the issuer to specify the time of the call This information, along with the phone number to call and the option to listen/participate in the call, is then made available to visitors as described below.

Another option available from screen 300 is to reply to investor inquiries. As is described below, visitors can ask the issuer questions by posting a message to the web site, as is known in the art and as described in more detail below. By selecting link 312, the issuer can initiate the process of responding to these inquires. After selecting link 312, screen 1600 (FIG. 16) is presented to the issuer. New messages are listed under new message banner 1602. Old messages and replies thereto are noted by old messages indicator 1604 and 1606, respectively (840). To view a new message, the investor selects new mail icon 1602. Selection of this icon displays screen 1700 (FIG. 17). This screen displays the message and gives the issuer a chance to respond (842). To respond to the message, the issuer selects reply button 1702, which, in turn, causes screen 1800 (FIG. 18) to be displayed. From within screen 1800, the issuer drafts a reply to the question contained in the message (844). When the issuer is finished, the issuer selects reply button 1802, whereupon screen 1900 (FIG. 19) is displayed. This screen is similar to screen 1600, but now, no new messages are indicated, while the replied message count (item 1602) is incremented by one. The issuer may review any old message or replies by selecting old messages icon 1604 or 1606, respectively.

Figure 20:
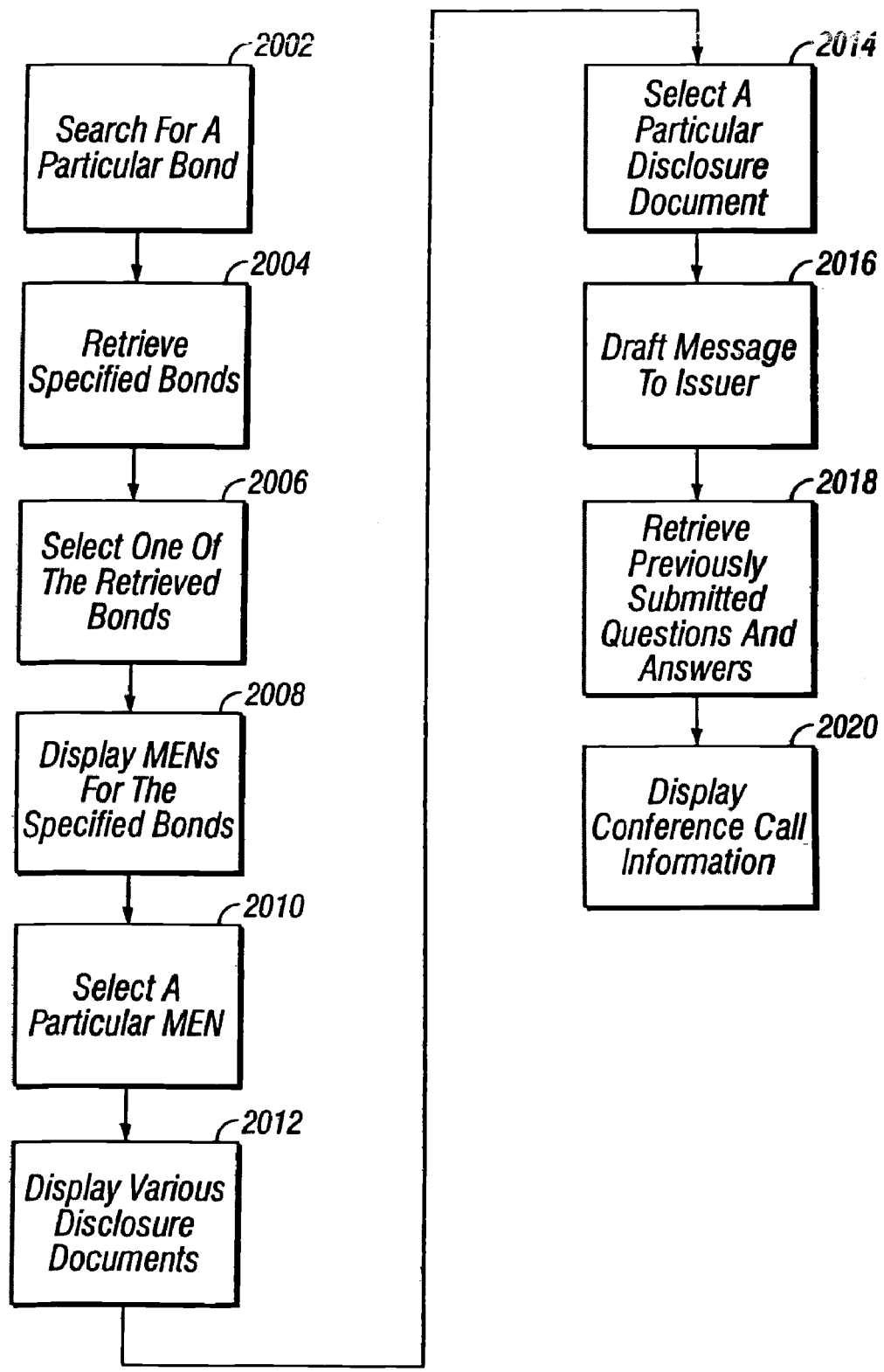
FIG. 20 is a flowchart illustrating a method by which a visitor can search and retrieve information about a bond.
Figure 21:
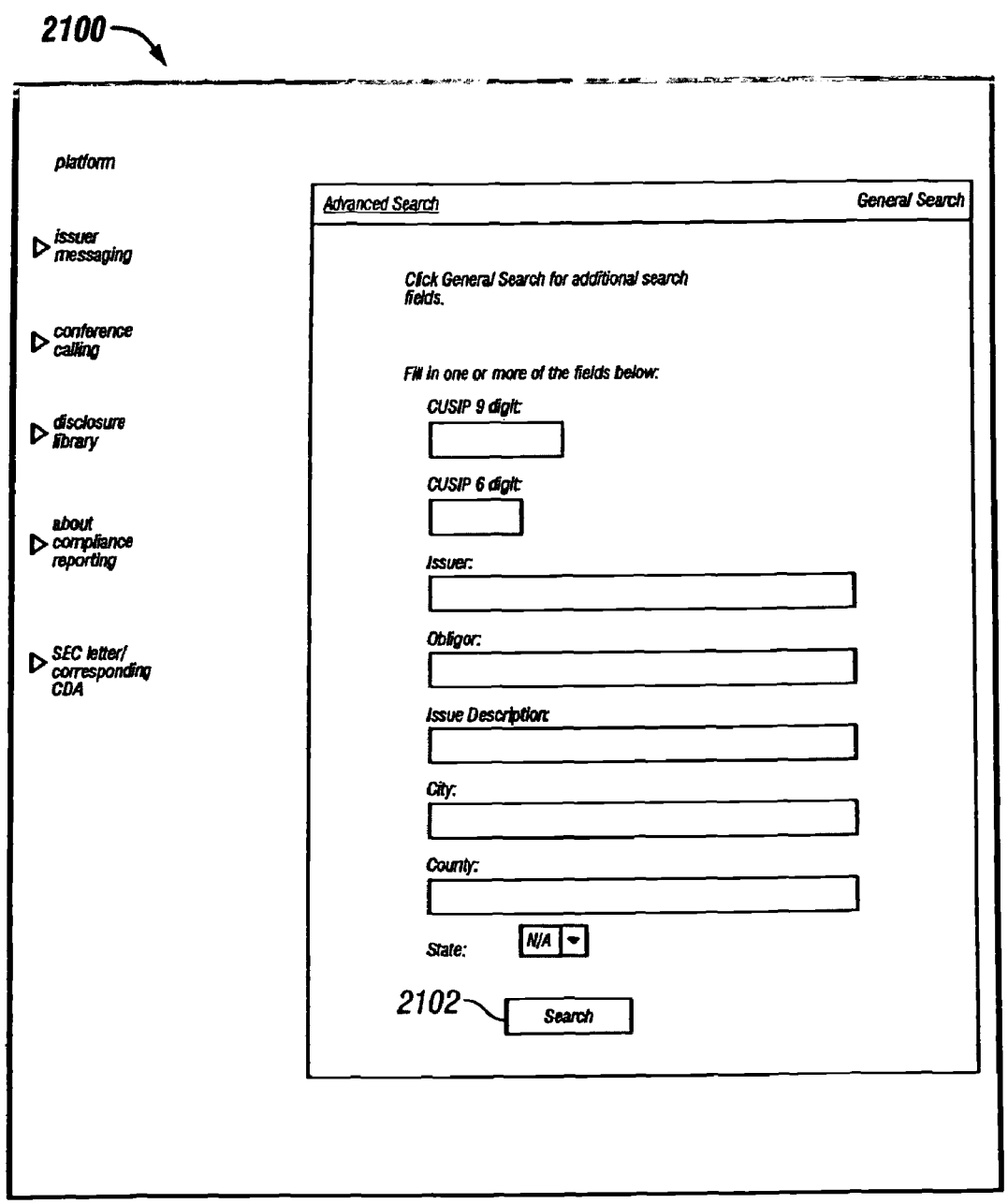
FIG. 21 is a screen from which the visitor can initiate a search.

Turning now to how a visitor interacts with the bond application, the visitor initially logs into the bond application using a password and username provided through the registration process. Once the username and password are accepted, the visitor is presented with screen 2100 (FIG. 21) whereby the visitor can search for various bonds. FIG. 20 contains a flowchart that depicts this process. As shown in screen 2100, the visitor can search for a bond by specifying information in one or more fields as shown in screen 2100 (2002). Although not shown in screen 2100, a search can also be conducted by specifying key words that appear in the bond information. After the search criteria are entered into screen 2100, the visitor initiates the search by selecting button 2102.

Figure 22A:
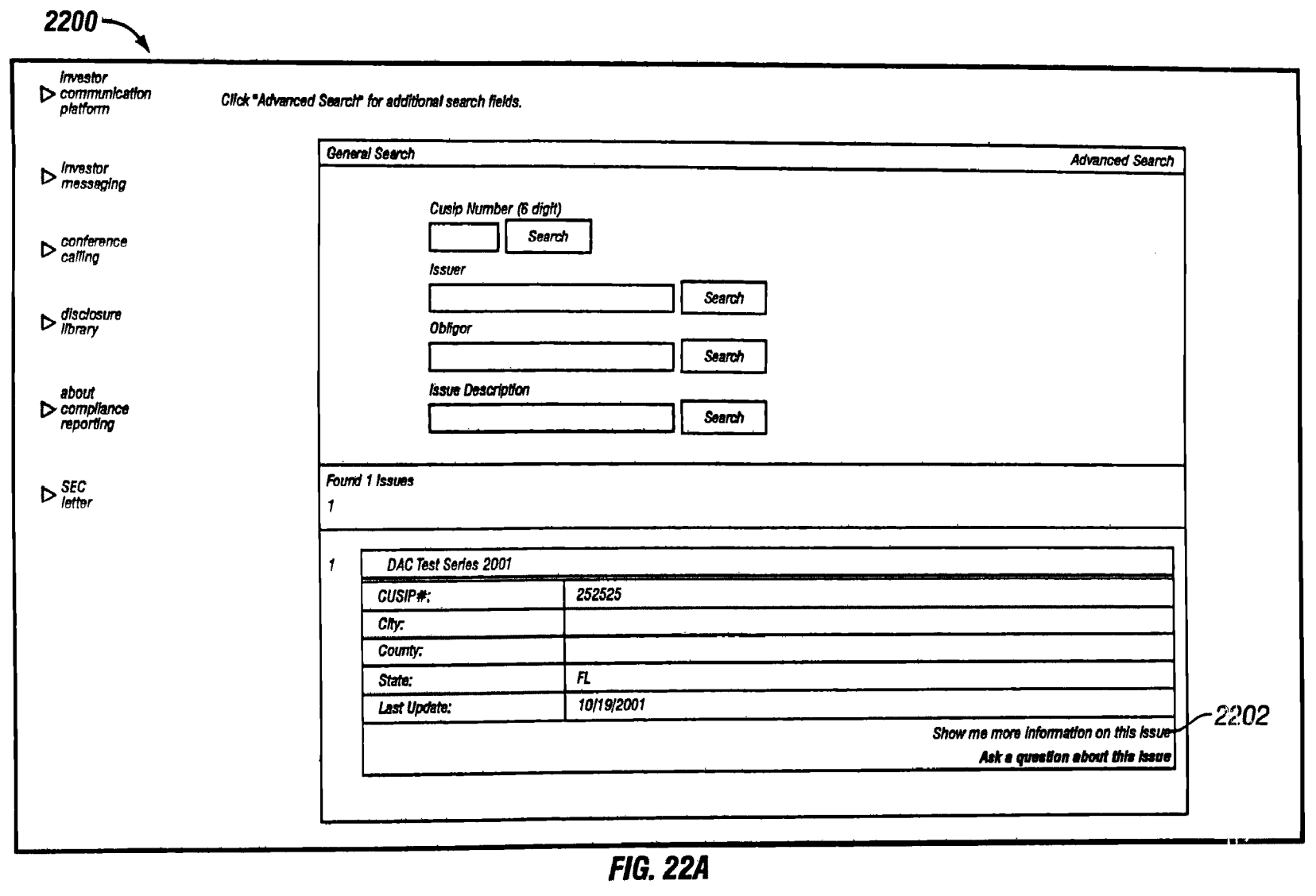
Figure 22B:
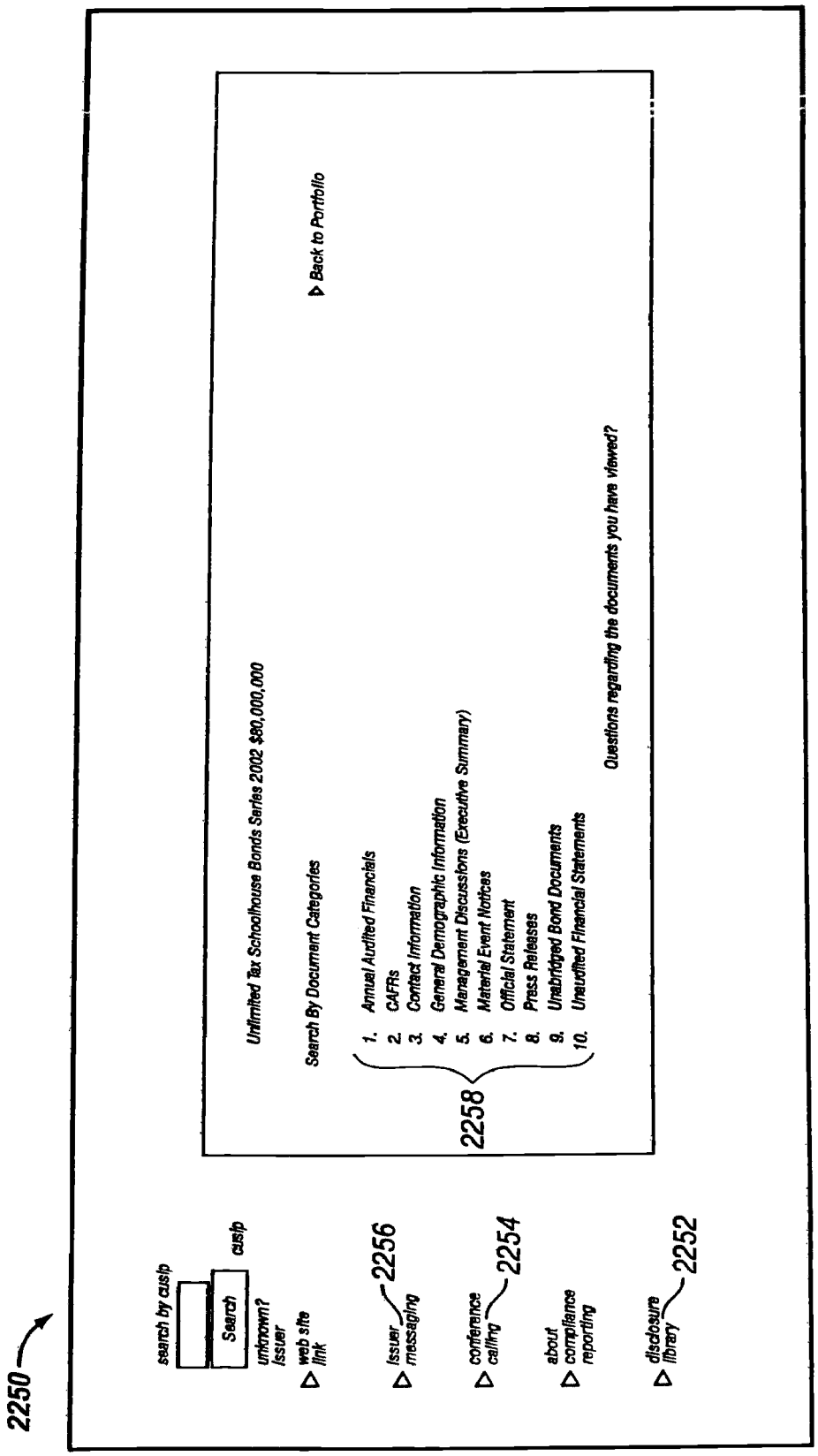
FIG. 22B is a screen that displays the document categories.

After the search is conducted, screen 2200 (FIG. 22A) is displayed showing the bonds that matched the search criteria (2004). As shown in screen 2200, only one bond was retrieved in this particular example. A visitor can view more information on this bond by selecting link 2202 (2006) which displays screen 2250 (FIG. 22B). Screen 2250 displays document categories 2258. Selecting the "MEN Notices" displays screen 2300 which displays a list of MENs and other options that allow the visitor to view more information about the bond (2008).

The visitor can view more information about an MEN by selecting view option 2302 from screen 2300 (2010). Upon selection of this option, the MSRB coversheet, screen 2400 (FIG. 24), is displayed showing detailed information about the selected MEN. For additional information, the visitor can download and view the file(s) listed in attachment field 2402.

Figure 25:
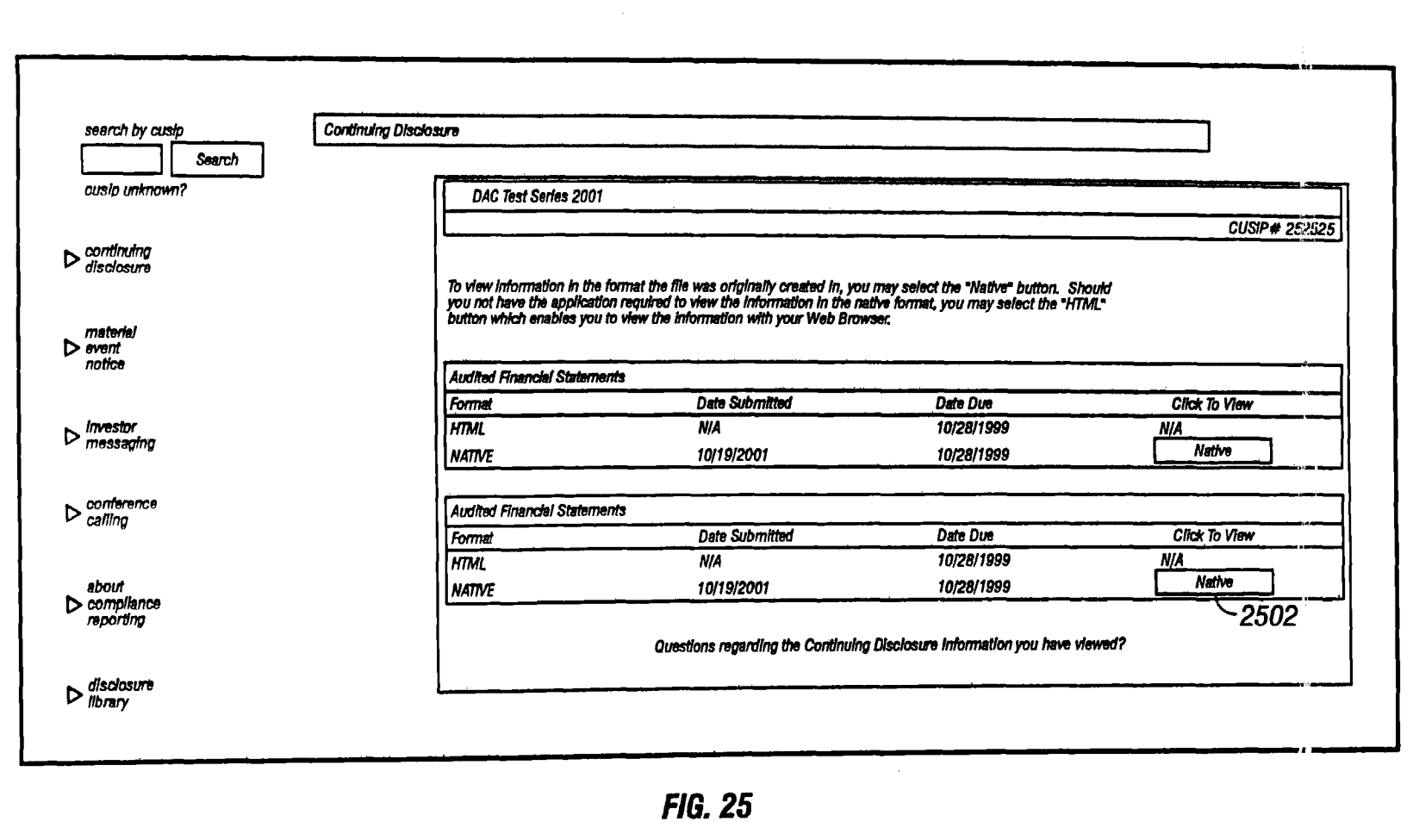

Assuming the visitor navigates back to screen 2250, the visitor can choose to view "Official Statements," which includes disclosure documents (2012). Once this option is selected, screen 2500 (FIG. 25) is displayed. This screen lists disclosure documents that have been submitted by the issuer. To view the disclosure documents, the visitor selects the document description icon 2502 (2014). Upon selection of icon 2502, the file can be viewed or downloaded to the visitor's computer system. The visitor can then view the file to review the disclosure documents.

Figure 26:
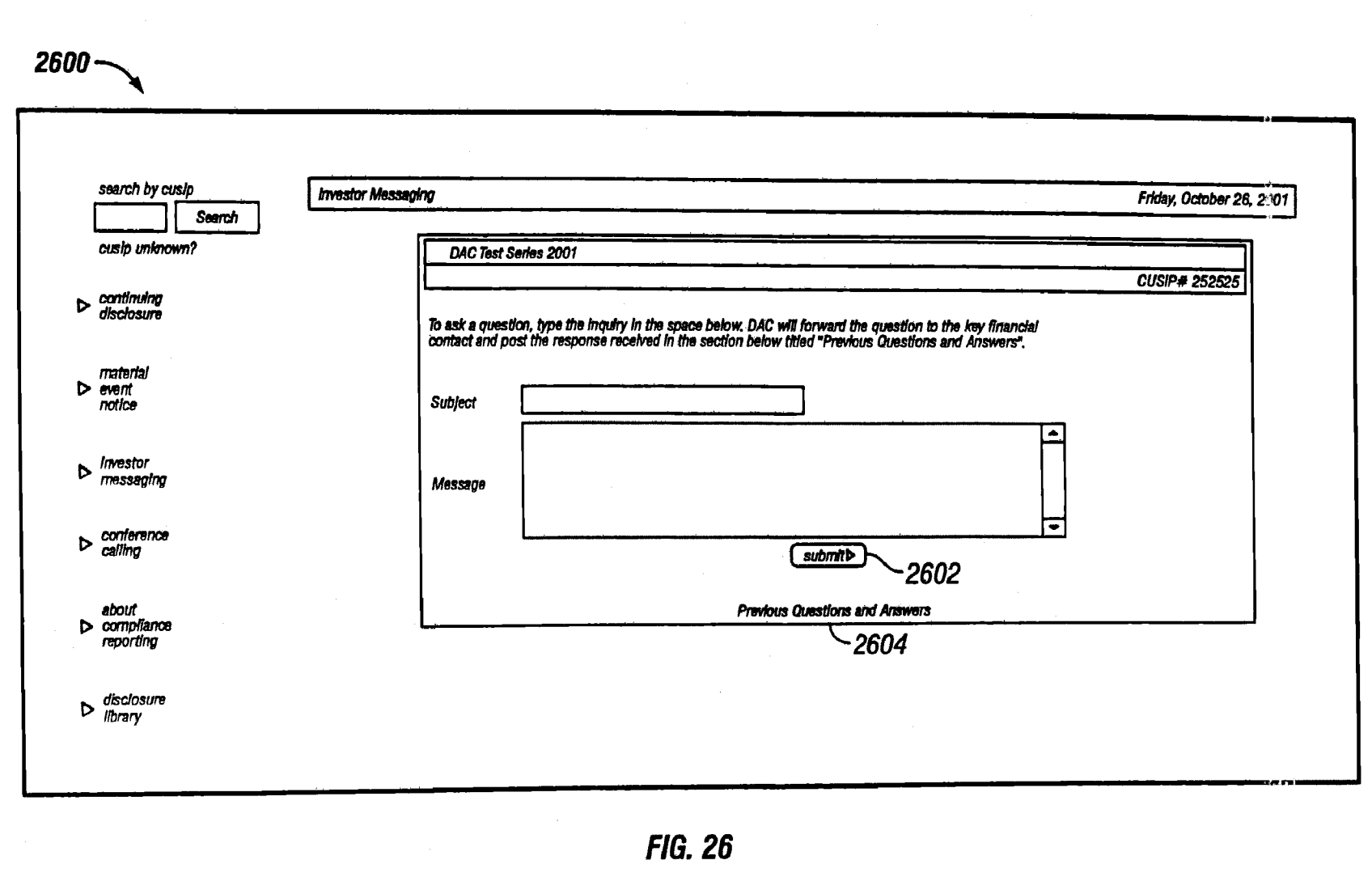
Figure 27:
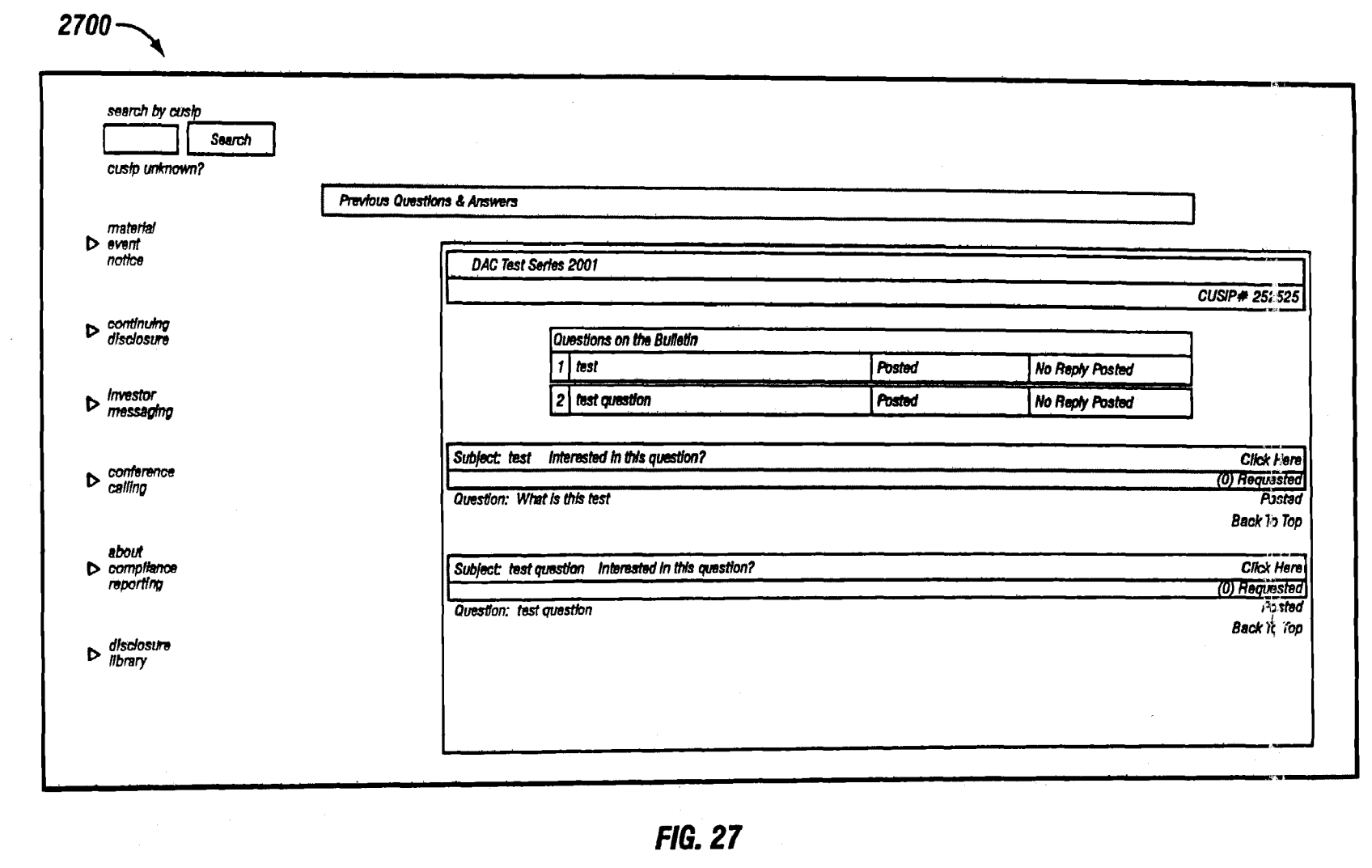

With reference again to screen 2250, the visitor can select ask a question option 2256 to post a question to the issuer. Upon selection of this option, screen 2600 (FIG. 26) is presented so that the visitor can draft a message to the issuer (2016). After the message is drafted, the visitor selects submit button 2602 to post the message. Also from screen 2600, the visitor can review previous questions and answers by selecting option 2604. The visitor can return to option 2604 some time after submitting the question to see if the issuer has submitted a reply to the question. If the visitor selects this option, screen 2700 (FIG. 27) appears. Screen 2700 displays questions that have been previously submitted to the issuer, along with any responses (2018). In this manner, the visitor can get answers to questions he has about a particular bond.

Figure 28:
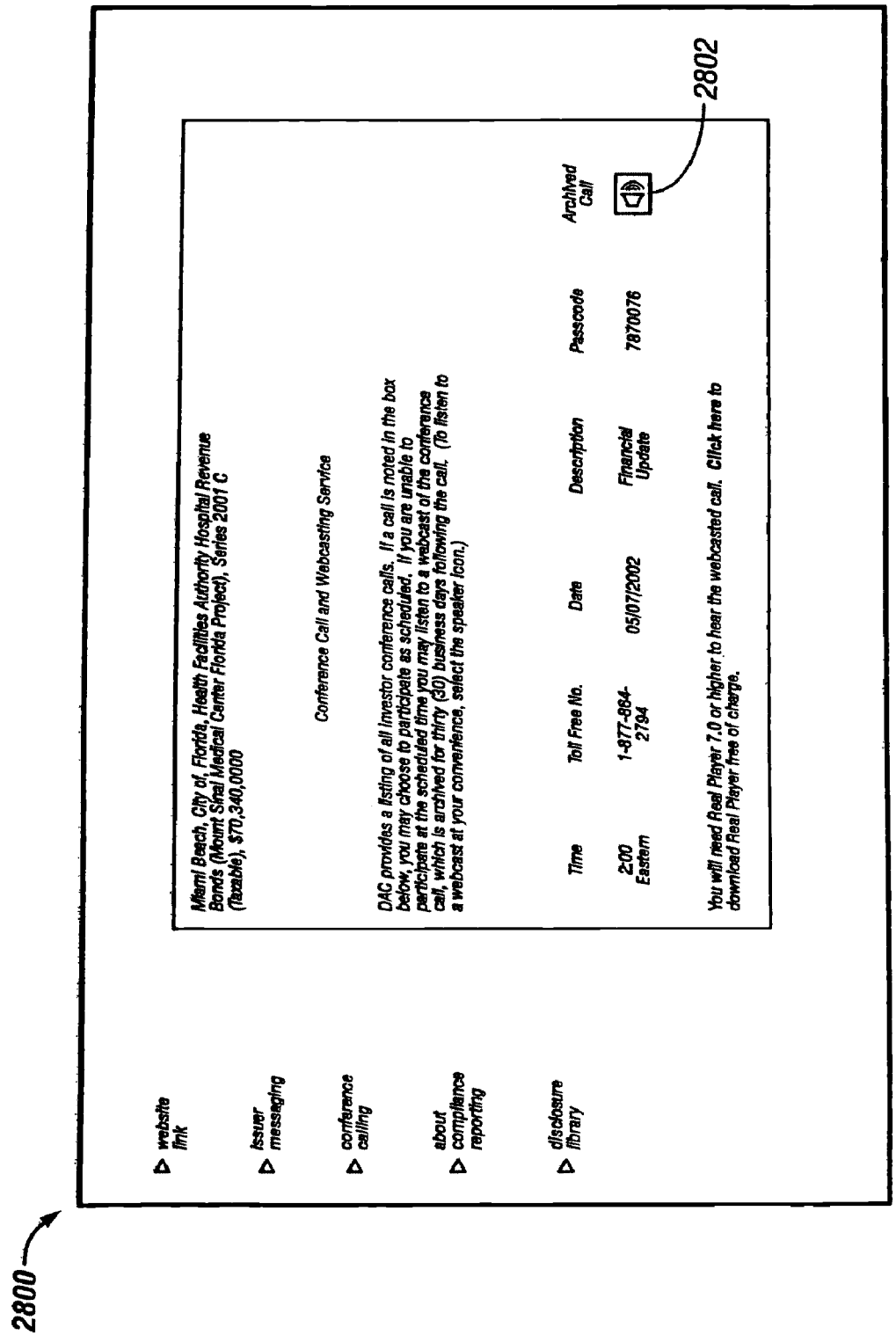
FIG. 28 is a screen that provides information on conference calls concerning the selected bond.

Returning to screen 2250, the visitor can select option 2254 to retrieve information about upcoming conference calls related to the bond. Upon making this selection, screen 2800 (FIG. 28) is displayed (2020). Screen 2800 displays information about upcoming call as well as previous conference calls. These previous calls are stored for some period of time and can be played back by the visitor by selecting achieved call icon 2802.

Returning to screen 2250, a user can also select option 2252 to view reference material about various types of bonds.

As indicated above, aspects of this invention pertain to specific "method functions" that can be implemented through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network (LAN), a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A system for managing bonds, comprising:
   a computer system, connected to a plurality of other computers by a computer network, wherein the computer system is configured to:
   receive from or on behalf of a bond issuer, at least one document, wherein the at least one document comprises either a disclosure document or a material event notice;
   receive from or on behalf of the bond issuer, via a graphical user interface, either (i) a first input, corresponding to a first displayed option, indicating that the at least one document is applicable to a particular bond issued by the bond issuer, the first input including a nine digit Committee on Uniform Securities identification Procedures (CUSIP) number that identifies the particular bond, or (ii) a second input, corresponding to a second displayed option, indicating that the at least one document is applicable to all bonds issued by the bond issuer, the second input including six digit CUSIP number that identifies the bond issuer;
   index the at least one document in accordance with the input received;
   publish the at least one document to a publicly available network location;
   transmit the at least one document to a municipal disclosure repository via the computer network; and
   verify that the at least one document has been received by the municipal disclosure repository.

2. The system of claim 1, wherein the computer system is further configured to automatically generate a Municipal Securities Rulemaking Board (MSRB) cover sheet for the at least one document, and wherein the at least one document is transmitted to the municipal disclosure repository with the MSRB cover sheet.

3. The system of claim 1, wherein the computer system is further configured to display a list of documents that have been sent to the municipal disclosure repository.

4. The system of claim 1, wherein the computer system is further configured to provide templates including common items of disclosure documents and material event notices and receive one or more files that include additional information relating to the at least one document.

5. The system of claim 1, further comprising a database that stores the at least one document for the life of a bond to which it applies.

6. The system of claim 1, wherein the computer system is further configured to provide a list of particular municipal disclosure repositories to which the at least one document has been transmitted.

7. The system of claim 6, wherein the computer system is further configured to receive confirmation of receipt from the municipal disclosure repositories to which the at least one document has been transmitted.

8. The system of claim 1, wherein the computer system is further configured to determine if the at least one document was submitted by a due date and generate a failure to file notice if the at least one document was not submitted by the due date.

9. The system of claim 1, wherein the computer system is further configured to determine when a due date for filing a document relating to a particular bond is due and prompt an issuer associated with the particular bond to file the document by the due date.

10. The system of claim 5, wherein the database includes all continuing disclosure documents and material event notices filed in association with a particular bond.

* * * * *